(12) United States Patent
Yamamoto

(10) Patent No.: US 6,232,986 B1
(45) Date of Patent: May 15, 2001

(54) THREE-DIMENSIONAL GRAPHICS PROCESSING APPARATUS

(75) Inventor: Hitoshi Yamamoto, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/131,402

(22) Filed: Aug. 10, 1998

(30) Foreign Application Priority Data

Aug. 12, 1997 (JP) .................................................. 9-217781

(51) Int. Cl.[7] .................................................. G06T 11/20
(52) U.S. Cl. .................................................. 345/441
(58) Field of Search .................................. 345/418, 419, 345/420, 421, 422, 425, 433, 428, 441

(56) References Cited

U.S. PATENT DOCUMENTS

| | | | |
|---|---|---|---|
| 6,008,815 | * 12/1999 | Levison | 345/428 |
| 6,084,599 | * 7/2000 | Nakatsuka et al. | 345/433 |
| 6,111,584 | * 8/2000 | Murphy | 345/430 |

FOREIGN PATENT DOCUMENTS 7-325933  12/1995 (JP).
8-55225   2/1996 (JP).

* cited by examiner

Primary Examiner—Mark Zimmerman
(74) Attorney, Agent, or Firm—Oblon, Spivak, McClelland, Maier & Neustadt, P.C.

(57) ABSTRACT

A three-dimensional graphics processing apparatus includes a parameter computation unit which calculates parameters based on vertex data of a polygon on a screen coordinate system, the vertex data being obtained by a geometrical transformation. A digital differential analyzer DDA unit produces pixel data, defining a polygon image on a screen, based on the vertex data and the parameters from the parameter computation unit through a DDA processing. The DDA unit performs a DDA processing in a controlled sequence for each of dots on a scan line, the dots including a right endpoint dot and a left endpoint dot where the scan line intersects a polygon right edge and a polygon left edge, respectively. The DDA unit outputs the pixel data corresponding to one of the dots to a frame memory substantially every time the DDA processing for one of the dots is performed.

10 Claims, 22 Drawing Sheets dX>dY dX<dY

POLYGON 1
POLYGON 2

PRIOR ART FIG.22
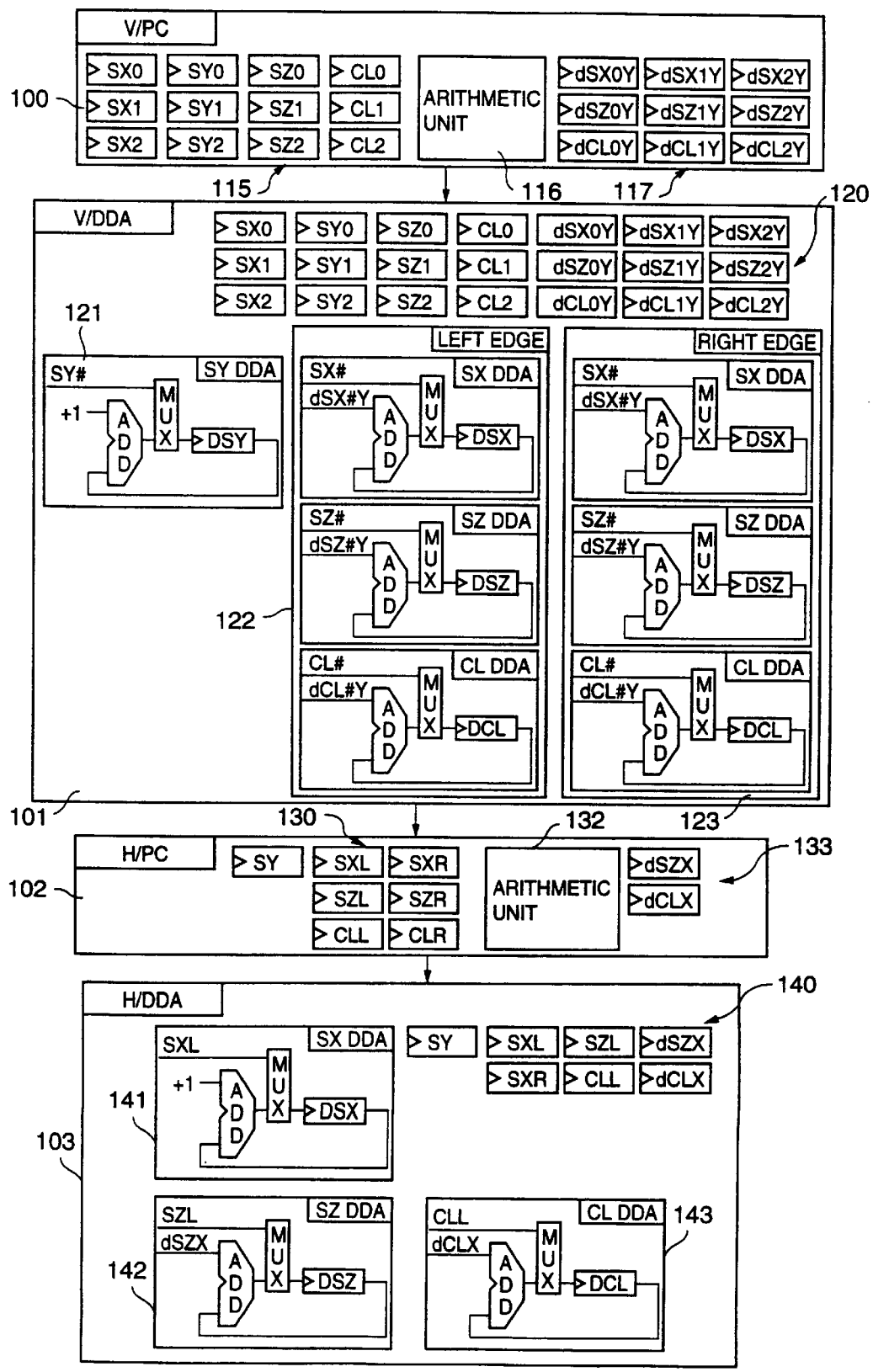

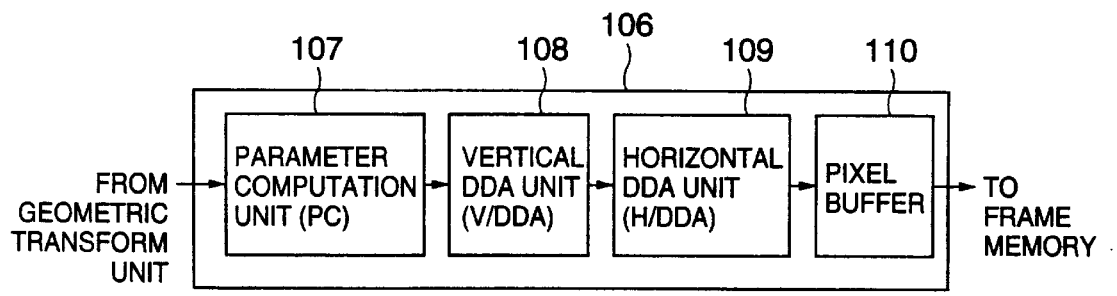
PRIOR ART FIG.25

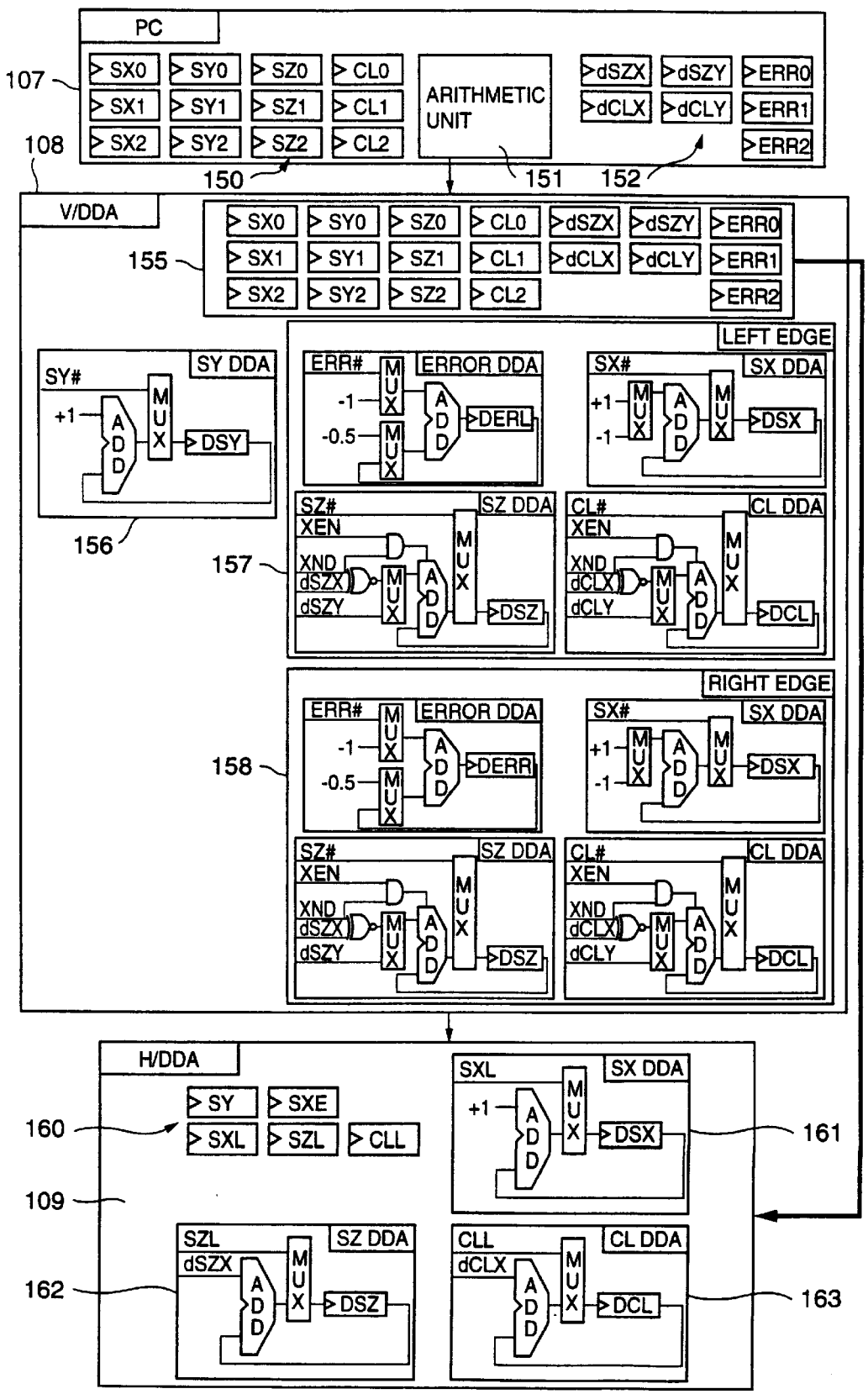
PRIOR ART FIG.26

THREE-DIMENSIONAL GRAPHICS PROCESSING APPARATUS

BACKGROUND OF THE INVENTION (1) Field of the Invention

The present invention relates to a three-dimensional graphics processing apparatus which carries out a drawing processing of a polygonal object.

(2) Description of the Related Art

A three-dimensional (3D) graphics processing apparatus which carries out a drawing processing of a polygonal object (hereinafter called a polygon) is known.

In the 3D graphics processing apparatus, polygon data from a CPU is input to a geometric transformation unit. The geometric transformation unit performs various geometric transformations for the input polygon data, such as a modeling transformation, a viewpoint transformation and a perspective projection. As a result of such transformations, the geometric transformation unit supplies polygon data, including vertex data (or vertex coordinates and a vertex color value) of the polygon on a screen coordinate system, to a drawing processor. The drawing processor performs a drawing processing for the polygon data from the geometric transformation unit, and produces a grid of pixel data defining an image of the polygon on a CRT screen as a result of the drawing processing. The pixel data produced by the drawing processor is stored in a frame memory. Hence, the image of the polygon is displayed on the screen of a CRT (cathode ray tube) monitor based on the pixel data stored in the frame memory.

Japanese Laid-Open Patent Application No. 7-325933 discloses a 3D graphics processing device which is designed for speedy drawing processing.

FIG. 21 shows a conceivable drawing processor 99 which is conceived that it performs a drawing processing similar to a drawing processing performed by a drawing processor of the 3D graphics processing device of the above-mentioned publication.

As shown in FIG. 21, in the drawing processor 99, the polygon data from the geometric transformation unit (not shown in FIG. 21) is supplied to a vertical parameter computation unit (V/PC) 100. As described above, the geometric transformation unit produces the polygon data including vertex data (or vertex coordinates and a vertex color value) of a polygon on a screen coordinate system, obtained as a result of the geometric transformations. The vertical parameter computation unit 100 calculates vertical parameters, which are used by a digital differential analyzer (hereinafter called DDA) algorithm with respect to a vertical direction of the polygon, based on the polygon data.

The vertical parameters and the polygon data are supplied to a vertical DDA unit (V/DDA) 101 by the vertical parameter computation unit 100. The vertical DDA unit 101 performs a vertical DDA processing of the polygon data with respect to the vertical direction of the polygon, based on the vertical parameters from the vertical parameter computation unit 100. As a result of the vertical DDA processing, the vertical DDA unit 101 produces exterior endpoint data (or endpoint coordinates and an endpoint color value) indicating intersection points between scan lines and the polygon right and left edges.

The exterior endpoint data are supplied to a horizontal parameter computation unit (H/PC) 102 by the vertical DDA unit 101. The horizontal parameter computation unit 102 calculates horizontal parameters, used by the DDA processing with respect to a horizontal direction of the polygon, based on the exterior endpoint data from the vertical DDA unit 101.

The horizontal parameters and the polygon data are supplied to a horizontal DDA unit (H/DDA) 103 by the horizontal parameter computation unit 102. The horizontal DDA unit 103 performs a horizontal DDA processing of the polygon data with respect to the horizontal direction of the polygon, based on the horizontal parameters from the horizontal parameter computation unit 102. As a result of the horizontal DDA processing, the horizontal DDA unit 103 produces a grid of pixel data defining an image of the polygon on the CRT screen. Specifically, the horizontal DDA unit 103 produces intermediate point data indicating intermediate-point coordinates and an intermediate-point color value for each of intermediate dots between the endpoints on the polygon right edge and on the polygon left edge, based on the horizontal parameters. Then, the pixel data, including the endpoint data produced by the vertical DDA unit 101 and the intermediate point data produced by the horizontal DDA unit 103, is temporarily stored in a pixel buffer 104.

After the temporary storing of the pixel data in the pixel buffer 104 is performed, the pixel data is supplied from the drawing processor 99 to the frame memory (not shown in FIG. 21). Hence, the image of the polygon is displayed on the screen of the CRT monitor (not shown) based on the pixel data stored in the frame memory. The entire operation of the drawing processor of FIG. 21 is controlled by a control unit (not shown).

FIG. 22 shows an essential part of the conceivable drawing processor 99 of FIG. 21. In FIG. 22, there is shown a configuration of the essential part of the drawing processor 99 which is conceived that it is similar to a configuration of the drawing processor of the 3D graphics processing device of the above-mentioned publication.

As shown in FIG. 22, the vertical parameter computation unit (V/PC) 100 includes a storing part 115 having various registers which store the polygon data supplied by the geometric transformation unit (not shown). The polygon data includes vertex data of the polygon on the screen coordinate system obtained as a result of the geometric transformations. Generally, the vertex data for one of vertices of a polygon is constituted by an x-coordinate (SX) on the screen coordinate system, a y-coordinate (SY) on the screen coordinate system, a z-value (SZ) and a color value (CL). The z-value (SZ) represents a typical distance of the vertex from a viewpoint of the polygon. The color value (CL) indicates an intensity of a color of the vertex.

In the configuration of FIG. 22, an example of the drawing processing of the polygon in the form of a triangle ABC as shown in FIG. 23A is taken into consideration. It is supposed that the vertex data for a vertex A of the triangle ABC is constituted by (SX0, SY0, SZ0, CL0), the vertex data for a vertex B of the triangle ABC is constituted by (SX1, SY1, SZ1, CL1), and the vertex data for a vertex C of the triangle ABC is constituted by (SX2, SY2, SZ2, CL2). In the configuration of FIG. 22, the polygon data items (SX0, SY0, SZ0, CL0), (SX1, SY1, SZ1, CL1) and (SX2, SY2, SZ2, CL2) are stored in the registers of the storing part 115.

The vertical parameter computation unit 100 includes an arithmetic unit 116 which calculates a plurality of differential values based on the polygon data items stored in the storing part 115. In the drawing processing of FIG. 23A, the plurality of differential values are calculated by the arithmetic unit 116 as follows:

$$\begin{aligned}
dSX0Y &= (SX1-SX0)/(SY1-SY0)\\
dSX1Y &= (SX2-SX1)/(SY2-SY1)\\
dSX2Y &= (SX2-SX0)/(SY2-SY0)\\
dSZ0Y &= (SZ1-SZ0)/(SY1-SY0)\\
dSZ1Y &= (SZ2-SZ1)/(SY2-SY1)\\
dSZ2Y &= (SZ2-SZ0)/(SY2-SY0)\\
dCL0Y &= (CL1-CL0)/(SY1-SY0)\\
dCL1Y &= (CL2-CL1)/(SY2-SY1)\\
dCL2Y &= (CL2-CL0)/(SY2-SY0)
\end{aligned} \quad (1)$$

For example, the differential value dSX0Y indicates a gradient of the x-coordinate of the polygon left edge AB with respect to the y-coordinate thereof, as is apparent from the first one of the above formulas (1).

As shown in FIG. 22, the vertical parameter computation unit 100 includes a vertical parameter storing part 117. The differential values dSX0Y, dSX1Y, dSX2Y, dSZ0Y, dSZ1Y, dSZ2Y, dCL0Y, dCL1Y and dCL2Y produced by the arithmetic unit 116 in accordance with the above formulas (1) are stored in registers of the vertical parameter storing part 117. These differential values are called the vertical parameters.

The vertical DDA unit 101 includes a storing part 120 having various registers which store the polygon data items and the differential values from the vertical parameter computation unit 100. The registers of the storing part 120 correspond to the registers of the vertical parameter computation unit 100, respectively.

In the vertical DDA unit 101, a DDA operation unit 121, left-edge operation units 122 and right-edge operation units 123 produce the exterior endpoint data, indicating the intersection points between the scan lines and the polygon right and left edges, based on the polygon data items and the differential values stored in the storing part 120. Specifically, the DDA operation unit 121 produces a y-coordinate (DSY) of the endpoints for each scan line.

The left-edge operation units 122 produce an x-coordinate (DSX) of each endpoint on the left edge, a z-value (DSZ) of the endpoint on the left edge, and a color value (DCL) of the endpoint on the left edge. The right-edge operation units 123 produce an x-coordinate (DSX) of each endpoint on the right edge, a z-value (DSZ) of the endpoint on the right edge, and a color value (DCL) of the endpoint on the right, edge.

For example, when the drawing processing for the polygon data with respect to a line L indicated in FIG. 23A is performed, the vertical DDA unit 101 produces the exterior endpoint data indicating the intersection points (indicated by white dots A and B in FIG. 23A) between the line L and the polygon left and right edges.

The horizontal parameter computation unit 102 receives the endpoint data (DSY, DSX, DSZ, DCL) of the endpoint on the left edge and the endpoint data (DSX, DSZ, DCL) on the right edge from the vertical DDA unit 101. The horizontal parameter computation unit 102 includes a storing part 130 having various registers which store the above data items from the vertical DDA unit 101 as (SY, SXL, SZL, CLL, SXR, SZR, CLR).

In the horizontal parameter computation unit 102, an arithmetic unit 132 calculates a plurality of differential values based on the data items stored in the storing part 130. In the drawing processing of FIG. 23A, the plurality of differential values are calculated by the arithmetic unit 132 in accordance with the following formulas:

$$\begin{aligned}
dSZX &= (SZR-SZL)/(SXR-SXL)\\
dCLX &= (CLR-CLL)/(SXR-SXL)
\end{aligned} \quad (2)$$

As shown in FIG. 22, the horizontal parameter computation unit 102 includes a horizontal parameter storing part 133. The differential values dSZX and dCLX produced by the arithmetic unit 132 in accordance with the above formulas (2) are stored in registers of the horizontal parameter storing part 133. These differential values are called the horizontal parameters.

The horizontal DDA unit 103 includes a storing part 140 having various registers which store the data items (SY, SXL, SZL, CLL, SXR) and the differential values (dSZX, dCLX) from the horizontal parameter computation unit 102. The registers of the storing part 140 correspond to the registers of the horizontal parameter computation unit 102, respectively.

In the horizontal DDA unit 103, a DDA operation unit 141, a DDA operation unit 142 and a DDA operation unit 143 produce a grid of pixel data defining an image of the polygon on the CRT screen, based on the data items and the horizontal parameters stored in the storing part 140. Specifically, the DDA operation unit 141 increments an x-coordinate (DSX) of an intermediate point starting from the x-coordinate (SXL) of the endpoint on the left edge and ending at the x-coordinate (SXR) of the endpoint on the right edge. The DDA operation unit 142 produces a z-value (DSZ) of the intermediate point when the x-coordinate (DSX) is incremented. The DDA operation unit, 143 produces a color value (DCL) of the intermediate point when the x-coordinate (DSX) is incremented.

For example, when the drawing processing for dots with respect to a line L indicated in FIG. 23B is performed, the horizontal DDA unit 103 produces pixel data (DSX, DSZ, DCL) of each of intermediate points on the line LW between the endpoints indicated by dots A and B in FIG. 23B. By repeating the above-mentioned procedures for all the scan lines, the pixel data (SY, DSX, DSZ, DCL), including the endpoint data from the vertical DDA unit 101 and the intermediate point data from the horizontal DDA unit 103, is produced for each dot of the image.

The pixel data produced by the horizontal DDA unit 103 is temporarily stored in the pixel buffer 104. After the temporary storing of the pixel data in the pixel buffer 104 is performed, the pixel data is supplied to the frame memory. Hence, the image of the polygon is displayed on the screen of the CRT monitor (not shown) based on the pixel data stored in the frame memory.

In the case of the above-described drawing processor 99, the left edge or right edge of a polygon is described by only the endpoint data from the vertical DDA unit 101. As shown in FIG. 24A, when the polygon in the form of a triangle having one edge slightly inclined to the horizontal direction is dealt with by the drawing processor 99, the aliasing or jaggies of a corresponding image for the slightly-inclined edge may occur. In addition, as shown in FIG. 24B, when the polygon data in the form of a triangle having a sharp-pointed vertex is dealt with by the drawing processor 99, the aliasing or jaggies of a corresponding image around the sharp-pointed vertex may occur. Therefore, when an image of a polygon is displayed on the CRT screen based on the pixel data produced by the drawing processor 99, the aliasing of a corresponding image may occur in some cases.

Further, Japanese Laid-Open Patent Application No.8-55225 discloses a 3D graphics processing device which utilizes a Bresenham algorithm in performing the drawing processing so as to avoid the aliasing of such an image obtained from the pixel data produced by the drawing processor of FIG. 21.

FIG. 25 shows a conceivable drawing processor 106 which is conceived that it performs a drawing processing similar to a drawing processing performed by a drawing processor of the 3D graphics processing device of the above-mentioned publication.

As shown in FIG. 25, in the drawing processor 106, the polygon data from the geometric transformation unit (not shown in FIG. 25) is supplied to a parameter computation unit (PC) 107. The polygon data includes vertex data (or vertex coordinates and a vertex color value) of a polygon on a screen coordinate system, obtained as a result of the geometric transformations. The parameter computation unit 107 calculates parameters, used by a DDA processing according to the Bresenham algorithm, based on the polygon data.

The parameters and the polygon data are supplied to a vertical DDA unit (V/DDA) 108 by the parameter computation unit 107. The vertical DDA unit 108 performs a vertical DDA processing according to the Bresenham algorithm, based on the parameters and the polygon data from the parameter computation unit 107. As a result of the vertical DDA processing, the vertical DDA unit 108 produces leftmost endpoint data indicating a leftmost intersection point between the scan line and the polygon left edge, and rightmost endpoint data indicating a rightmost intersection point between the scan line and the polygon right edge.

The endpoint data, the parameters and the polygon data are supplied to a horizontal DDA unit (H/DDA) 109 by the vertical DDA unit 108. The horizontal DDA unit 109 performs a DDA processing with respect to each of intermediate dots between the leftmost endpoint and the rightmost endpoint based on the data including the endpoint data, the parameters and the polygon data from the vertical DDA unit 108. As a result of the DDA processing, the horizontal DDA unit 109 produces a grid of pixel data defining an image of the polygon on the CRT screen. Then, the pixel data, including the endpoint data produced by the vertical DDA unit 108 and the intermediate point data produced by the horizontal DDA unit 109, is temporarily stored in a pixel buffer 110.

After the temporary storing of the pixel data in the pixel buffer 110 is performed, the pixel data is supplied from the drawing processor 106 to the frame memory (not shown in FIG. 25). Hence, the image of the polygon is displayed on the screen of the CRT monitor based on the pixel data stored in the frame memory. The entire operation of the drawing processor 106 of FIG. 25 is controlled by a control unit (not shown).

FIG. 26 shows an essential part of the drawing processor 106 of FIG. 25. In FIG. 26, there is shown a configuration of the essential part of the drawing processor 106 which is conceived that it is similar to a configuration of the drawing processor of the 3D graphics processing device of the above-mentioned publication.

As shown in FIG. 26, the parameter computation unit (PC) 107 includes a storing part 150 having various registers which store the polygon data supplied by the geometric transformation unit (not shown). The polygon data includes vertex data of the polygon on the screen coordinate system obtained as a result of the geometric transformations.

In the configuration of FIG. 26, an example of the drawing processing of the polygon in the form of a triangle ABC as shown in FIG. 27A is taken into consideration. It is supposed that the vertex data for a vertex A of the triangle ABC is constituted by (SX0, SY0, SZ0, CL0), the vertex data for a vertex B of the triangle ABC is constituted by (SX1, SY1, SZ1, CL1), and the vertex data for a vertex C of the triangle ABC is constituted by (SX2, SY2, SZ2, CL2). In the configuration of FIG. 26, the polygon data items (SX0, SY0, SZ0, CL0), (SX1, SY1, SZ1, CL1) and (SX2, SY2, SZ2, CL2) are stored in the registers of the storing part 150.

The parameter computation unit 107 includes an arithmetic unit 151 which calculates a plurality of differential values based on the polygon data items stored in the storing part 150. In the drawing processing of FIG. 27A, the plurality of differential values are calculated by the arithmetic unit 151 in accordance with the following formulas:

$$
\begin{aligned}
dSZX &= \{(SZ2\text{-}SZ0) \times (SY1\text{-}SY2) - (SZ1\text{-}SZ2) \times (SY2\text{-}SY0)\}/ \\
&\quad \{(SX2\text{-}SX0) \times (SY1\text{-}SY2) - (SX1\text{-}SX2) \times (SY2\text{-}SY0)\} \\
dSZY &= \{(SZ1\text{-}SZ2) \times (SX2\text{-}SX0) - (SZ2\text{-}SZ0) \times (SX1\text{-}SX2)\}/ \\
&\quad \{(SX2\text{-}SX0) \times (SY1\text{-}SY2) - (SX1\text{-}SX2) \times (SY2\text{-}SY0)\} \\
dCLX &= \{(CL2\text{-}CL0) \times (SY1\text{-}SY2) - (CL1\text{-}CL2) \times (SY2\text{-}SY0)\}/ \\
&\quad \{(SX2\text{-}SX0) \times (SY1\text{-}SY2) - (SX1\text{-}SX2) \times (SY2\text{-}SY0)\} \\
dCLY &= \{(CL1\text{-}CL2) \times (SX2\text{-}SX0) - (CL2\text{-}CL0) \times (SX1\text{-}SX2)\}/ \\
&\quad \{(SX2\text{-}SX0) \times (SY1\text{-}SY2) - (SX1\text{-}SX2) \times (SY2\text{-}SY0)\}
\end{aligned}
\tag{3}
$$

Further, the arithmetic unit 151 calculates error values ERR0, ERR1 and ERR2, used by the Bresenham algorithm for the edges AB, BC and AC of the polygon, in accordance with the following formulas:

```
if (abs(SX0-SX1) > abs(SY0-SY1))
    ERR0 = abs(SY0-SY1)/abs(SX0-SX1)
else
    ERR0 = abs(SX0-SX1)/abs(SY0-SY1)
if (abs(SX1-SX2) > abs(SY1-SY2))
    ERR0 = abs(SY1-SY2)/abs(SX1-SX2)
else
    ERR0 = abs(SX1-SX2)/abs(SY1-SY2)
if (abs(SX0-SX2) > abs(SY0-SY2))
    ERR0 = abs(SY0-SY2)/abs(SX0-SX2)
else
    ERR0 = abs(SX0-SX2)/abs(SY0-SY2)
        where abs() denotes the absolute value of the
        term inside the parentheses          (4)
```

As shown in FIG. 26, the parameter computation unit 107 includes a parameter storing part 152. The differential values dSZX, dSZY, dCLX and dCLY produced in accordance with the above formulas (3) and the error values ERR0, ERR1 and ERR2 produced in accordance with this above formulas (4) are stored in registers of the parameter storing part 152. These differential values are called the parameters.

The arithmetic unit 151 calculates a gradient parameter of the y-coordinate of each of the polygon edges AB, BC and AC with respect to the x-coordinate thereof, and chooses one of x-major and y-major for each of the gradient parameters of the polygon edges AB, BC and AC. As shown in FIG. 5A, when dx>dy, the x-major is chosen for the related edge by the arithmetic unit 151. As shown in FIG. 5B, when dx<dy, the y-major is chosen for the related edge by the arithmetic unit 151. Further, the arithmetic unit 151 determines the sign of each of the gradient parameters of the polygon edges AB, BC and AC. When the sign of the related gradient parameter is positive, the slope of the related edge is directed to the right-hand down. When the sign of the related gradient parameter is negative, the slope of the related edge is directed to the left-hand down. The gradient parameters and the signs for the polygon edges AB, BC and AC are stored in work buffers (not shown) of the control unit.

The vertical DDA unit 108 includes a storing part 155 having various registers which store the polygon data items, the differential values and the error values from the parameter computation unit 107. The registers of the storing part 155 correspond to the registers of the parameter computation unit 107, respectively. The vertical DDA unit 108 performs a vertical DDA processing according to the Bresenham algorithm, based on the polygon data items, the differential values, the error values and the gradient parameters from the parameter computation unit 107.

In the vertical DDA unit 108, a DDA operation unit 156, left-edge operation units 157 and right-edge operation units 158 produce leftmost endpoint data indicating a leftmost endpoint on the intersection of each scan line and the polygon left edge, and rightmost endpoint data indicating a rightmost endpoint on the intersection of each scan line and the polygon right edge. Specifically, the DDA operation unit 156 produces a y-coordinate (DSY) of the endpoints for each scan line. The left-edge operation units 157 produce an x-coordinate (DSX) of each leftmost endpoint on the left edge, a z-value (DSZ) of the leftmost endpoint, and a color value (DCL) of the leftmost endpoint. The right-edge operation units 158 produce an x-coordinate (DSX) of each rightmost endpoint on the right edge, a z-value (DSZ) of the rightmost endpoint, and a color value (DCL) of the rightmost endpoint.

For example, when the drawing processing for the polygon data with respect to a line L indicated in FIG. 27A is performed, the vertical DDA unit 108 produces the endpoint data indicating the leftmost and rightmost intersection points (indicated by white dots A and B in FIG. 27A) between the line L and the polygon left and right edges.

The horizontal DDA unit 109 receives the endpoint data (DSY, DSX, DSZ, DCL) of the leftmost endpoint related to the polygon left edge and the endpoint data (DSX) of the rightmost endpoint related to the polygon right edge from the vertical DDA unit 108. The horizontal DDA unit 109 includes a storing part 160 having various registers which store the above data items from the vertical DDA unit 108 as (SY, SXL, SZL, CLL, SXE). Further, the horizontal DDA unit 109 receives the differential values (dSZX, dCLX) from the storing part 155 of the vertical DDA unit 108 when they are needed.

In the horizontal DDA unit 109, a DDA operation unit 161, a DDA operation unit 162 and a DDA operation unit 163 produce a grid of pixel data defining an image of the polygon on the CRT screen, based on the endpoint data stored in the storing part 160. Specifically, the DDA operation unit 161 increments an x-coordinate (DSX) of an intermediate point starting from the x-coordinate (SXL) of the leftmost endpoint on the left edge and ending at the x-coordinate (SXE) of the rightmost endpoint on the right edge. The DDA operation unit 162 produces a z-value (DSZ) of the intermediate point when the x-coordinate (DSX) is incremented. The DDA operation unit 163 produces a color value (DCL) of the intermediate point when the x-coordinate (DSX) is incremented.

For example, when the drawing processing for dots with respect to a line L indicated in FIG. 27B is performed, the horizontal DDA unit 109 produces pixel data (DSX, DSZ, DCL) of each of intermediate points on the line L between the endpoints indicated by dots A and B in FIG. 27B. By repeating the above procedures for all the scan lines, the pixel data (SY, DSX, DSZ, DCL) is produced for each dot of the image by the horizontal DDA unit 109.

The pixel data produced by the horizontal DDA unit 109 is temporarily stored in the pixel buffer 110. After the temporary storing of the pixel data in the pixel buffer 110 is performed, the pixel data is supplied to the frame memory. Hence, the image of the polygon is displayed on the screen of the CRT monitor (not shown) based on the pixel data stored in the frame memory.

As described above, in the drawing processor 106 of FIG. 25, the vertical DDA unit 108 produces the leftmost endpoint data indicating the leftmost endpoint on the intersection of each scan line and the polygon left edge, and the rightmost endpoint data indicating the rightmost endpoint on the intersection of each scan line and the polygon right edge. The horizontal DDA unit 109 produces the pixel data of each of intermediate points on the scan line between the leftmost endpoint and the rightmost endpoint. By repeating the above procedures for all the scan lines, the pixel data for each dot of the image on the CRT screen is produced by the horizontal DDA unit 109. The z-value calculated by the drawing processors 99 and 106 may be used for a hidden-surface removal processing using the z-buffer algorithm.

In the case of the above-described drawing processor 106, the pixel data related to the polygon left and right edges are produced according to the Bresenham algorithm. As shown in FIG. 28A, when the polygon in the form of a triangle having one edge slightly inclined to the horizontal direction is dealt with by the drawing processor 106, the aliasing or jaggies of a corresponding image for the slightly-inclined edge can be minimized. In addition, as shown in FIG. 28B, when the polygon data in the form of a triangle having a sharp-pointed vertex is dealt with by the drawing processor 106, the aliasing or jaggies of a corresponding image around the sharp-pointed vertex can be minimized. Therefore, when an image of a polygon is displayed on the CRT screen based on the pixel data produced by the drawing processor 106, the aliasing of a corresponding image can be eliminated.

FIG. 29A and FIG. 29B are diagrams for explaining an operation performed by the drawing processor 99 of FIG. 21. In the drawing processor 99, the pipelining of the drawing processing is carried out by the vertical parameter computation unit 100, the vertical DDA unit 101, the horizontal parameter computation unit 102 and the horizontal DDA unit 103. The pixel data defining an image of the polygon on the CRT screen is produced by repetition of the drawing processing.

When the polygon in the form of a vertically elongated triangle, such as that shown in FIG. 29A, is dealt with, the run time of the horizontal DDA unit (H/DDA) 103 is reduced. However, the run time of the horizontal parameter computation unit (M/PC) 102 remains constant with no regard to the image drawing range. As shown in FIG. 29B, the waiting condition of the horizontal DDA unit (H/DDA) 103 frequently occurs at times indicated by "T1" in FIG. 29B. Hence, the drawing processor 99 is not effective in the drawing processing for a certain type of the polygon. The drawing processing 99 may cause a delay of the drawing processing when a certain type of the polygon is dealt with.

FIG. 30A and FIG. 30B are diagrams for explaining an operation performed by the drawing processor 106 of FIG. 25. In the drawing processor 106, the pipelining of the drawing processing is carried out by the parameter computation unit 107, the vertical DDA unit 108 and the horizontal DDA unit 109. The pixel data defining an image of a single polygon on the CRT screen is produced by repetition of the drawing processing.

When the polygon in the form of a horizontally elongated triangle, such as that shown in FIG. 30A, is dealt with, the run time of the vertical DDA unit (V/DDA) 108 is increased. As shown in FIG. 30B, the waiting condition of the horizontal DDA unit (H/DDA) 109 frequently occurs in such time periods as indicated by "T2" in FIG. 30B. Hence, the drawing processor 106 is not adequately effective in the drawing processing for a certain type of the polygon. The drawing processing 106 may cause a delay of the drawing processing when a certain type of the polygon is dealt with.

SUMMARY OF THE INVENTION

An object of the present invention is to provide an improved three-dimensional graphics processing apparatus in which the above-described problems are eliminated.

Another object of the present invention is to provide a three-dimensional graphics processing apparatus which provides speedy drawing processing for a polygon of any type with no need to enlarge the circuit size.

The above-mentioned objects of the present invention are achieved by a three-dimensional graphics processing apparatus comprising: a parameter computation unit which calculates parameters based on vertex data of the polygon on a screen coordinate system, the vertex data being obtained by a geometrical transformation; and a digital differential analyzer DDA unit which produces pixel data, defining a polygon image on a screen, based on the vertex data and the parameters from the parameter computation unit through a DDA processing, wherein the DDA unit performs the DDA processing in a controlled sequence for each of dots on a scan line, the dots including a right endpoint dot and a left endpoint dot where the scan line intersects a polygon right edge and a polygon left edge, respectively, and the DDA unit outputs the pixel data corresponding to one of the dots to a frame memory substantially every time the DDA processing for one of the dots is performed.

In the three-dimensional graphics processing apparatus of the present invention, the DDA unit outputs pixel data corresponding to one of dots on a scan line to the frame memory substantially every time the DDA processing for one of the dots is performed by the DDA unit. The three-dimensional graphics processing apparatus of the present invention is effective in providing speedy drawing processing for a polygon of any type. It is not necessary to enlarge the circuit size in order to incorporate the above capability in the three-dimensional graphics processing apparatus of the present invention. It is possible for the three-dimensional graphics processing apparatus to effectively prevent a delay of the drawing processing as in the conventional three-dimensional graphics processing devices.

BRIEF DESCRIPTION OF THE DRAWINGS

Other objects, features and advantages of the present invention will become more apparent from the following detailed description when read in conjunction with, the accompanying drawings in which:

FIG. 22 is a circuit diagram illustrating an essential part of the drawing processor of FIG. 21;

FIG. 25 is a block diagram of a conceivable drawing processor related to a drawing processor of another conventional 3D graphics processing device;

FIG. 26 is a circuit diagram illustrating an essential part of the drawing processor of FIG. 25;

DETAILED DESCRIPTION OF THE PREFERRED EMBODIMENTS

A description will now be given of the preferred embodiments of the present invention with reference to the accompanying drawings.

Figure 1:
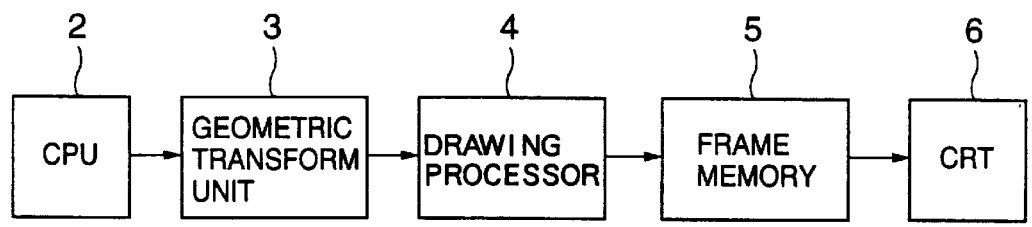
FIG. 1 is a block diagram showing a general configuration of a 3D graphics processing apparatus.

FIG. 1 shows a general configuration of a 3D graphics processing apparatus.

In the 3D graphics processing apparatus of FIG. 1, polygon data from a CPU 2 is input to a geometric transformation unit 3. The geometric transformation unit 3 performs geometric transformations for the input polygon data, such as a modeling transformation, a viewpoint transformation and a perspective projection. As a result of such transformations, the geometric transformation unit 3 supplies polygon data, including vertex data (or vertex coordinates and a vertex color value) of a polygon on a screen coordinate system, to a drawing processor 4. The drawing processor 4 performs a drawing processing of the polygon based on the polygon data from the geometric transformation unit 3, and produces a grid of pixel data, defining an image of the polygon on a CRT screen, as a result of the drawing processing. The pixel data produced by the drawing processor 4 is stored in a frame memory 5. Hence, the image of the polygon is displayed on the screen of a CRT (cathode ray tube) monitor 6 based on the pixel data stored in the frame memory 5. In the configuration of FIG. 1, the CPU 2 controls the entire operation of the 3D graphics processing apparatus.

Figure 2:
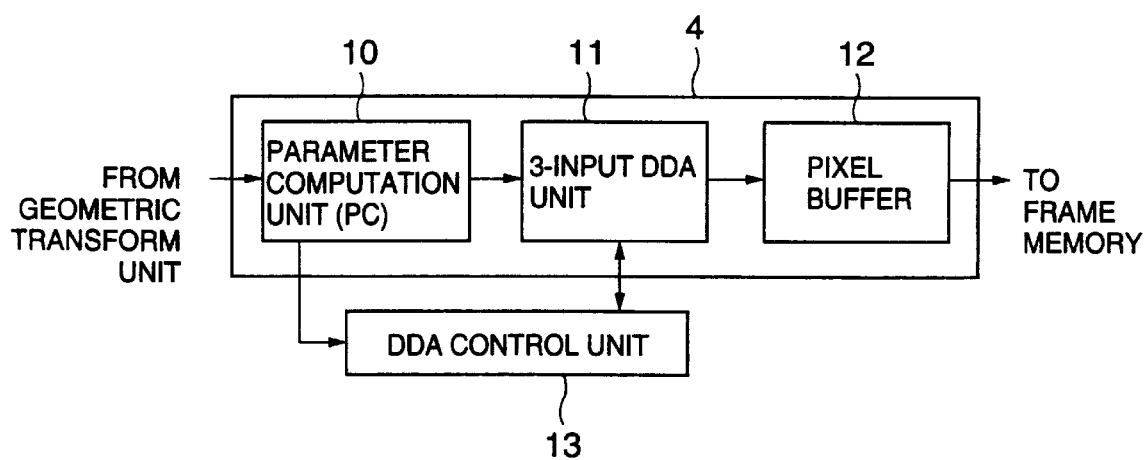
FIG. 2 is a block diagram showing an essential part of a preferred embodiment of a 3D graphics processing apparatus of the present invention.

FIG. 2 shows an essential part of a preferred embodiment of a 3D graphics processing apparatus of the present invention. The 3D graphics processing apparatus of the present invention is characterized by a drawing processor which provides speedy drawing processing for a polygon by avoiding a waiting condition of an element of the drawing processor during the drawing processing.

In the 3D graphics processing apparatus of the present embodiment, the drawing processor corresponds to the drawing processor 4 in the 3D graphics processing apparatus of FIG. 1. As shown in FIG. 2, the polygon data from the geometric transformation unit 3 is supplied to a parameter computation unit (PC) 10 of the drawing processor 4. The polygon data, supplied to the parameter computation unit 10, includes vertex data (or vertex coordinates and a vertex color value) of a polygon on a screen coordinate system produced as a result of the geometric transformations. The parameter computation unit 10 calculates parameters, used by a DDA processing to be performed by a 3-input DDA unit (3-INPUT DDA) 11, based on the polygon data from the geometric transformation unit 3.

The polygon data and the parameters are supplied to the 3-input DDA unit 11 by the parameter computation unit 10. The 3-input DDA unit 11 selectively performs one of a "left" DDA processing, a "right" DDA processing and a "middle" DDA processing in a controlled sequence based on the parameters and the polygon data supplied by the parameter computation unit 10. The 3-input DDA unit 11 outputs pixel data for one of dots on a scan line near a polygon left edge when the left DDA processing is performed. The 3-input DDA unit 11 outputs pixel data for one of the dots on the scan line near a polygon right edge when the right DDA processing is performed. The 3-input DDA unit 11 outputs pixel data for one of intermediate dots between the polygon left edge and the polygon right edge when the middle DDA processing is performed.

As a result of the above-mentioned DDA processing, the 3-input DDA unit 11 produces a grid of pixel. data, defining an image of the polygon on the CRT screen, and outputs the pixel data for each of the dots on the scan line to a pixel buffer 12. The entire pixel data is temporarily stored in the pixel buffer 12. After the temporary storing of the pixel data in the pixel buffer 12 is performed, the pixel data is supplied from the drawing processor 4 to the frame memory 5. Then, the image of the polygon is displayed on the screen of the CRT monitor based on the pixel data stored in the frame memory 5.

As shown in FIG. 2, a DDA control unit 13 is connected to the parameter computation unit 10. The polygon data and the parameters are supplied to the DDA control unit 13 by the parameter computation unit 10. Based on the polygon data and the parameters, the DDA control unit 13 controls the 3-input DDA unit 11 such that the 3-input DDA unit selectively performs one of the left DDA processing, the right DDA processing and the middle DDA processing by making a determination as to whether a predetermined condition for changing one of the left, right and middle DDA processing to another is satisfied for each of the dots on the scan line.

Figure 3:
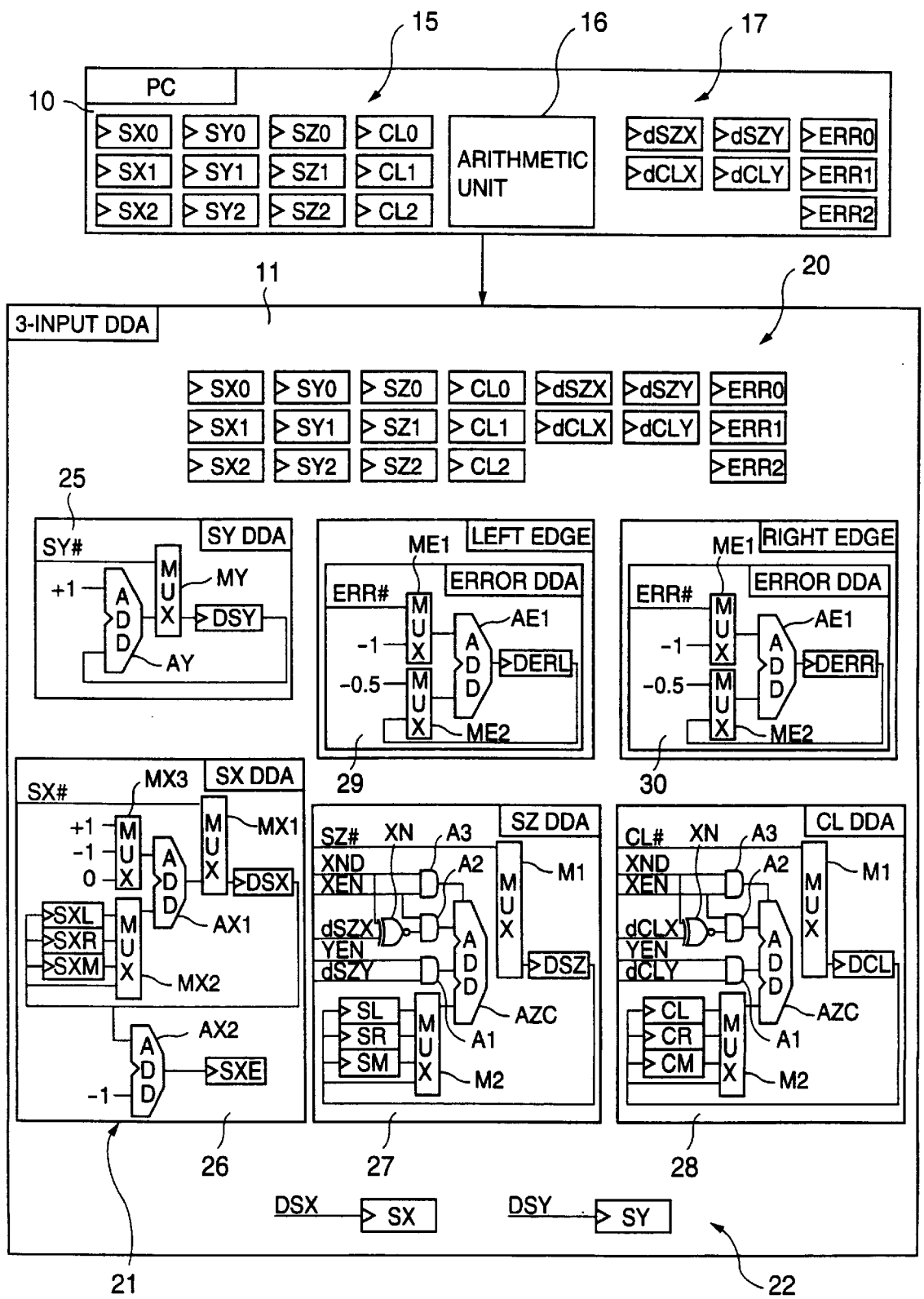
FIG. 3 is a circuit diagram illustrating a configuration of a drawing processor in the preferred embodiment of the 3D graphics processing apparatus.
Figure 4:
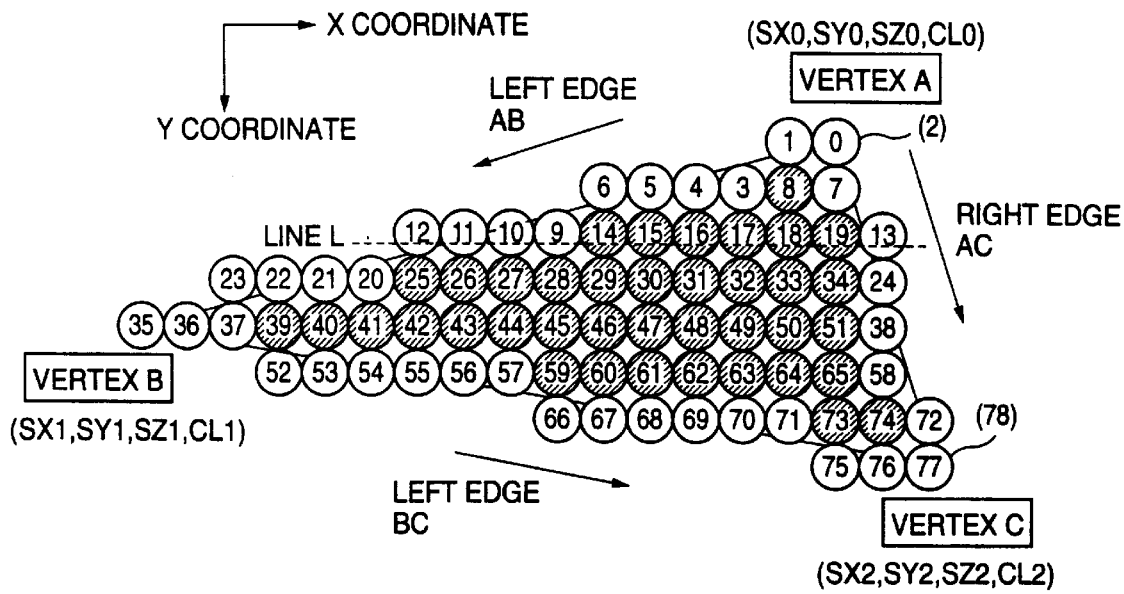
FIG. 4 is a diagram for explaining an operation of the drawing processor of FIG. 3.

FIG. 3 is a circuit diagram illustrating a configuration of the drawing processor 4 in the present embodiment of the 3D graphics processing apparatus of FIG. 2. FIG. 4 is a diagram for explaining an operation of the drawing processor 4 of FIG. 3. In FIG. 4, an example of the drawing processing of a polygon in the form of a triangle ABC, performed by the drawing processor 4, is shown.

As shown in FIG. 3, the parameter computation unit (PC) 10 includes an input data part 15 having various registers which store the polygon data supplied by the geometric transformation unit 3. The polygon data includes vertex data of the polygon on the screen coordinate system obtained as a result of the geometric transformations.

In the present embodiment of the drawing processor 4 of FIG. 3, the example of the drawing processing of the polygon in the form of the triangle ABC as shown in FIG. 4 is taken into consideration. It is supposed that the vertex data for a vertex A of the triangle ABC is constituted by (SX0, SY0, SZ0, CL0), the vertex data for a vertex B of the triangle ABC is constituted by (SX1, SY1, SZ1, CL1), and the vertex data for a vertex C of the triangle ABC is constituted by (SX2, SY2, SZ2, CL2). In the embodiment of FIG. 3, the polygon data (SX0, SY0, SZ0, CL0), (SX1, SY1, SZ1, CL1) and (SX2, SY2, SZ2, CL2) are stored in the registers of the input data part 15.

The parameter computation unit 10 includes an arithmetic unit 16 which calculates differential values dSZX, dSZY, dCLX and dCLY based on the polygon data stored in the input data part 15. These differential values are calculated by the arithmetic unit 16 in accordance with the above formulas (3) in the description of the related art. The differential values dSZX, dSZY, dCLX and dCLY calculated by the arithmetic unit 16 are stored in corresponding registers of an output data part 17. These differential values are called the parameters.

Further, the arithmetic unit 16 calculates error values ERR0, ERR1 and ERR2, used by the Bresenham algorithm for the edges AB, BC and AC of the polygon, in accordance with the above formulas (4) in the description of the related art. The error values ERR0, ERR1 and ERR2 calculated are stored in corresponding registers of the output data part 17.

Figure 5A:
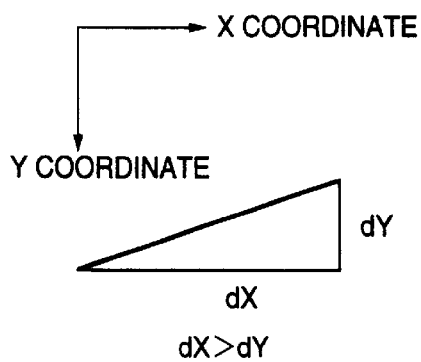
FIG. 5A and FIG. 5B are diagrams for explaining a gradient parameter of a polygon edge.
Figure 5B:
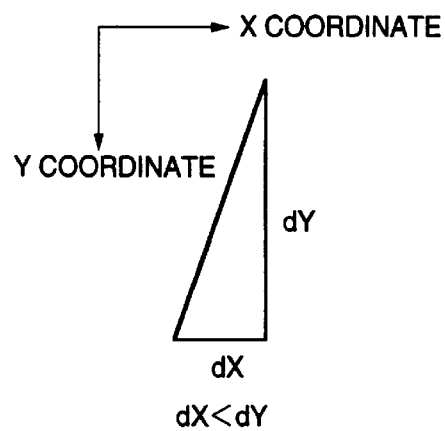

Further, the arithmetic unit 16 calculates a gradient parameter of the y-coordinate of each of the polygon edges AB, BC and AC with respect to the x-coordinate thereof, and chooses one of x-major and y-major for each of the gradient parameters of the polygon edges AB, BC and AC. As shown in FIG. 5A, when dx>dy, the x-major is chosen for the related edge by the arithmetic unit 16. As shown in FIG. 5B, when dx<dy, the y-major is chosen for the related edge by the arithmetic unit 16. Further, the arithmetic unit 16 determines the sign of each of the gradient parameters of the polygon edges AB, BC and AC. When the sign of the related gradient parameter is positive, the slope of the related edge is directed to the right-hand down. When the sign of the related gradient parameter is negative, the slope of the related edge is directed to the left-hand down. The gradient parameters and the signs for the polygon edges AB, BC and AC, calculated by the arithmetic unit 16, are stored in work buffers (not shown) of the DDA control unit 13. When the 3-input DDA unit 11 is controlled by the DDA control unit 13, the gradient parameters and the signs thereof stored in the work buffers are used by the DDA control unit 13.

As shown in FIG. 3, the 3-input DDA unit 11 includes an input data part 20 having various registers which store the polygon data, the differential values and the error values from the parameter computation unit 10. The registers SX0, SY0, SZ0, CL0, SX1, SY1, SZ1, CL1, SX2, SY2, SZ2, CL2, dSZX, dSZY, dCLX, dCLY, ERR0, ERR1 and ERR2 of the input data part 20 correspond to the registers of the parameter computation unit 10, respectively. Further, the 3-input DDA unit 11 includes a DDA operation part 21 and an output data part 22.

The output data part 22 is constituted by two registers SX and SY. The register SX stores a value which has been stored in a register DSX (which will be described below) of the DDA operation part 21. The register SY stores a value which has been stored in a register DSY (which will be described below) of the DDA operation part 21.

The DDA operation part 21 is constituted by six DDA operation circuits 25 through 30. Each of the DDA operation circuits 25 through 30 is controlled by the DDA control unit 13 such that each DDA operation circuit performs a corresponding DDA processing, which will be described below.

In the DDA operation part 21, as shown in FIG. 3, the DDA operation circuit 25 is constituted by a 2-input adder AY, a multiplexer MY and a register DSY. The DDA operation circuit 25 performs a DDA processing to produce a y-coordinate of one of dots on a scan line from the vertex data supplied by the parameter computation unit 10, and outputs the resulting y-coordinate. The smallest y-coordinate (SY#) of the polygon data (from the input data part 20) and an output of the 2-input adder AY are supplied to inputs of the multiplexer MY. In FIG. 3, the suffix character "#" denotes one of the integers 0, 1 and 2 corresponding to the vertices A, B and C of the polygon shown in FIG. 4. The multiplexer MY supplies a selected one of the supplied data items to the register DSY so that the selected data item is stored in the register DSY. The 2-input adder AY adds "+1" to the value of the register DSY and outputs the resulting value (or the result of the addition) to the multiplexer MY. The value of the register DSY indicates the resulting y-coordinate, and the value having been stored in the register DSY is stored in the register SY of the output data part 22.

The DDA operation circuit 26 is constituted by three multiplexers MX1, MX2, MX3, two 2-input adders AX1, AX2, and five registers DSX, SXL, SXR, SXM, SXE. The DDA operation circuit 26 performs a DDA processing (or a selected one of a left DDA processing, a right DDA processing and a middle DDA processing) to produce an x-coordinate of one of dots on a scan line from the vertex data output by the parameter computation unit 10, and outputs the resulting x-coordinate.

In the DDA operation circuit 26, the x-coordinate (SX#) of the polygon data (from the input data part 20) and an output of the 2-input adder AX1 are supplied to inputs of the multiplexer MX1. The multiplexer MX1 supplies a selected one of the supplied data items to the register DSX so that the selected data item is stored in the register DSX. The value having been stored in the register DSX is stored in each of the registers SXL, SXR and SXM. The value of the register SXL indicates the x-coordinate stored in the register DSX at the end of the left DDA processing. The value of the register SXR indicates the x-coordinate stored in the register DSX at the end of the right DDA processing. The value of the register SXM indicates the largest x-coordinate stored in the register DSX when the left DDA processing is performed. The value of the register DSX indicates the resulting x-coordinate, and the value having been stored in the register DSX is stored in the register SX of the output data part 22.

Further, in the DDA operation circuit 26, the x-coordinates of the registers SXL, SXR and SXM and the x-coordinate of the register DSX are supplied to inputs of the multiplexer MX2. When one of the left DDA processing, the right DDA processing and the middle DDA processing on the 3-input DDA unit 11 is changed to a next DDA processing, the multiplexer MX2 immediately supplies a selected one (corresponding to the next DDA processing) of the supplied x-coordinates from the registers SXL, SXR and SXM to an input of the 2-input adder AX1. Otherwise, the multiplexer MX2 supplies the x-coordinate of the register DSX to the input of the 2-input adder AX1. For example, when the left DDA processing is initially performed on the 3-input DDA unit 11, the multiplexer MX2 supplies the x-coordinate of the register SXL to the input of the 2-input adder AX1. In addition, when no x-coordinate is stored in any of the registers SXL, SXR and SXM, the multiplexer MX2 supplies the x-coordinate of the register DSX to the input of the 2-input adder AX1.

In the multiplexer MX3 of the DDA operation circuit 26, the values "+1", "−1" and "0" are supplied to inputs of the multiplexer MX3. When the x-major is chosen for the related gradient parameter and the sign of the related gradient parameter is positive during the left DDA processing or the right DDA processing, the multiplexer MX3 supplies the value "+1" to the other input of the 2-input adder AX1. When the x-major is chosen for the related gradient parameter and the sign of the related gradient parameter is negative during the left DDA processing or the right DDA processing, the multiplexer MX3 supplies the value "−1" to the other input of the 2-input adder AX1. When the y-major is chosen for the related gradient parameter, the multiplexer MX3 supplies a selected one of the values "+1", "−1" and "0" to the other input of the 2-input adder AX1. One of the values "+1", "−1" and "0" is selected by the multiplexer MX3 based on the related gradient parameter and the sign thereof. Further, when the middle DDA processing is performed, the multiplexer MX3 supplies the value "+1" to the other input of the 2-input adder AX1.

In the DDA operation circuit 26, both an output of the multiplexer MX2 and an output of the multiplexer MX3 are supplied to the inputs of the 2-input adder AX1. The 2-input adder AX1 outputs the resulting value (or the result of the addition) to the multiplexer MX1. The smallest x-coordinate of the polygon data during the right DDA processing (from the register DSX) and the value "−1" are supplied to inputs of the 2-input adder AX2. The 2-input adder AX2 adds "−1" to the value of the smallest x-coordinate, and outputs the resulting value (or the result of the addition) to the register SXE so that the resulting value is stored in the register SXE. Hence, the value of the register SXE indicates the smallest x-coordinate minus 1 when the right DDA processing is performed, and it is used by the DDA control unit 13 to determine whether a condition for changing the middle DDA processing to the left DDA processing is satisfied, or to determine whether a process end condition is satisfied.

The DDA operation circuit 27 is constituted by two multiplexers M1, M2, a 3-input adder AZC, three registers SL, SR, SM, three AND gates A1, A2, A3, and an XNOR gate XN. The DDA operation circuit 27 performs a DDA processing (or a selected one of a left DDA processing, a right DDA processing and a middle DDA processing) to produce a z-value of one of dots on a scan line from the vertex data and the parameters supplied by the parameter computation unit 10, and outputs the resulting z-value.

In the DDA operation circuit 27, the z-value (SZ#) of the polygon data (from the input data part 20) and an output of the 3-input adder AZC are supplied to inputs of the multiplexer M1. The multiplexer M1 supplies a selected one of the supplied data items to the register DSZ so that the selected data item is stored in the register DSZ. The value having been stored in the register DSZ is stored in each of the registers SL, SR and SM. The value of the register SL indicates the z-value stored in the register DSZ at the end of the left DDA processing. The value of the register SR indicates the z-value stored in the register DSZ at the end of the right DDA processing. The value of the register SM indicates the z-value stored in the register DSZ when the left DDA processing for the largest x-coordinate is performed. The value of the register DSZ indicates the resulting z-value.

Further, in the DDA operation circuit 27, the z-values of the registers SL, SR and SM and the z-value of the register DSZ are supplied to inputs of the multiplexer M2. When one of the left DDA processing, the right DDA processing and the middle DDA processing on the 3-input DDA unit 11 is changed to a next DDA processing, the multiplexer M2 immediately supplies a selected one (corresponding to the next DDA processing) of the supplied z-values from the registers SL, SR and SM to a first input of the 3-input adder AZC. Otherwise, the multiplexer M2 supplies the z-value of the register DSZ to the first input of the 3-input adder AZC. In addition, when no z-value is stored in any of the registers SL, SR and SM, the multiplexer M2 supplies the z-value of the register DSZ to the first input of the 3-input adder AZC.

In the 3-input adder AZC of the DDA operation circuit 27, an output of the AND gate A1 is supplied to a second input of the 3-input adder AZC, and an output of the AND gate A2 is supplied to a third input of the 3-input adder AZC. The AND gate A1 provides AND of a YEN signal (from the DDA control unit 13) and the differential value dSZY (from the input data part 20), and outputs the resulting signal to the second input of the 3-input adder AZC. The AND gate A2 provides AND of an output of the XNOR gate XN1 and an XEN signal (from the DDA control unit 13), and outputs the resulting signal to the third input of the 3-input adder AZC. The XNOR gate XN1 provides XNOR of an XND signal (from the DDA control unit 13) and the differential value dSZX (from the input data part 20), and outputs the resulting signal to the AND gate A2. Further, the AND gate A3 provides AND of the XND signal and the XEN signal (both from the DDA control unit 13), and outputs the resulting signal to a carry input of the 3-input adder AZC. The 3-input adder AZC provides a sum of the three supplied data items in accordance with the signal supplied to the carry input thereof, and outputs the resulting value (the sum) to the multiplexer M1.

The YEN signal is set at the high level by the DDA control unit 13 when the addition of the differential value dSZY or dCLY is performed. Otherwise the YEN signal is set at the low level. The XEN signal is set at the high level by the DDA control unit 13 when the addition or subtraction of the differential value dSZX or dCLX is performed. Otherwise the XEN signal is set at the low level. The XND signal is set at the high level by the DDA control unit 13 when the subtraction of the differential value dSZX or dCLX is performed. Otherwise the XND signal is set at the low level. The setting of these signals is controlled by the DDA control unit 13 based on the gradient parameters and the signs thereof stored in the work buffers.

The DDA operation circuit 28 is constituted by two multiplexers M1, M2, a 3-input adder AZC, three registers DCL, CL, CR, CM, three AND gates A1, A2, A3, and an XNOR gate XN. The DDA operation circuit 28 performs a DDA processing (or a selected one of a left DDA processing, a right DDA processing and a middle DDA processing) to produce a color value of one of dots on a scan line from the vertex data and the parameters output by the parameter computation unit 10, and outputs the resulting color value.

As shown in FIG. 3, the elements of the DDA operation circuit 28 are essentially the same as corresponding elements of the above-described DDA operation circuit 27 except the following matters.

In the DDA operation circuit 28, the z-value (SZ#) of the polygon data of the DDA operation circuit 27 is replaced by the color value (CL#) of the polygon data; the z-values stored in the registers SL, SR and SM of the DDA operation circuit 27 are replaced by the color values stored in the registers CL, CR and CM; the differential values dSZX and dSZY of the DDA operation circuit 27 are replaced by the differential values dCLX and dCLY; and the register DSZ of the DDA operation circuit 27 is replaced by the register DCL. Except the above matters, the elements of the DDA operation circuit 28 which are the same as corresponding elements of the DDA operation circuit 27 are designated by the same reference numerals in FIG. 3, and a description thereof will be omitted. In the DDA operation circuit 28, the value of the register DCL indicates the resulting color value.

The DDA operation circuit 29 is constituted by two multiplexers ME1, ME2, a 2-input adder AE1, and a register DERL. The DDA operation circuit 29 performs a DDA processing to produce the error value of one of dots on a scan line near the polygon left edge, in order to output pixel data for the one of dots when the left DDA processing is performed.

The error value (ERR#) of the polygon left edge (from the input data part 20) and the value "−1" are supplied to inputs of the multiplexer ME1. The multiplexer ME1 supplies a selected one of the supplied data items to an input of the 2-input adder AE1. The value of the register DERL and the value "−0.51" are supplied to inputs of the multiplexer ME2. The multiplexer ME2 supplies a selected one of the supplied data items to the other input of the 2-input adder AE1. The 2-input adder AE1 provides a sum of the output of the multiplexer ME1 and the output of the multiplexer ME2, and outputs the resulting value to the register DERL. The value of the register DERL indicates the resulting error value.

Similar to the DDA operation circuit 29, as shown in FIG. 3, the DDA operation circuit 30 is constituted by two multiplexers ME1, ME2, a 2-input adder AE1, and a register DERR. The DDA operation circuit 30 performs a DDA processing to produce the error value of one of dots on a scan line near the polygon right edge, in order to output pixel data for the one of dots when the right DDA processing is performed.

The error value (ERR#) of the polygon right edge (from the input data part 20) and the value "−1" are supplied to inputs of the multiplexer ME1. The multiplexer ME1 supplies a selected one of the supplied data items to an input of the 2-input adder AE1. The value of the register DERR and the value "−0.5" are supplied to inputs of the multiplexer ME2. The multiplexer ME2 supplies a selected one of the supplied data items to the other input of the 2-input adder AE1. The 2-input adder AE1 provides a sum of the output of the multiplexer ME1 and the output of the multiplexer ME2, and outputs the resulting value to the register DERR. The value of the register DERR indicates the resulting error value.

Figure 6:
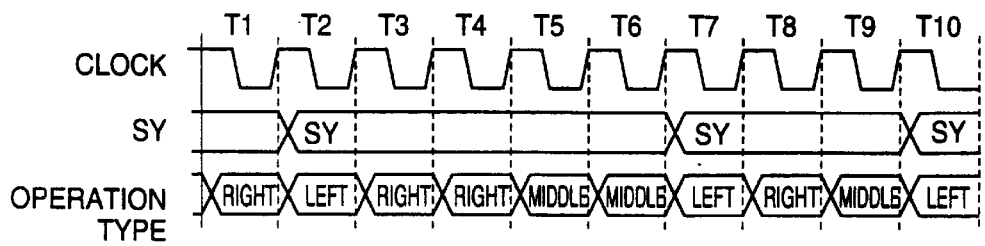
FIG. 6 is a time chart for explaining a basic pattern of a drawing processing performed by the drawing processor of FIG. 3.

FIG. 6 shows a basic pattern of a drawing processing performed by the drawing processor 4 of FIG. 3. For the sake of convenience of description, the drawing processing is performed for the polygon shown in FIG. 4.

As shown in FIG. 6, when the polygon data and the parameters for dots on the scan line L of the polygon of FIG. 4 are supplied to the 3-input DDA unit 11, the 3-input DDA unit 11 selectively performs one of the left DDA processing, the right DDA processing and the middle DDA processing in a controlled sequence based on the parameters and the polygon data. The 3-input DDA unit 11 outputs pixel data for one of the white dots 9 through 12 on the scan line L near the polygon left edge when the left DDA processing is performed. The 3-input DDA unit 11 outputs pixel data for the white dot 13 on the scan line L near the polygon right edge when the right DDA processing is performed. The 3-input DDA unit 11 outputs pixel data for one of intermediate dots (or the black dots 14 through 19) between the polygon left edge and the polygon right edge when the middle DDA processing is performed. Based on the polygon data and the parameters, the DDA control unit 13 controls the 3-input DDA unit 11 such that the 3-input DDA unit selectively performs one of the left DDA processing, the right DDA processing and the middle DDA processing by making a determination as to whether a predetermined condition for changing one of the left, right and middle DDA processing to another is satisfied for one of the dots on the scan line.

Figure 7:
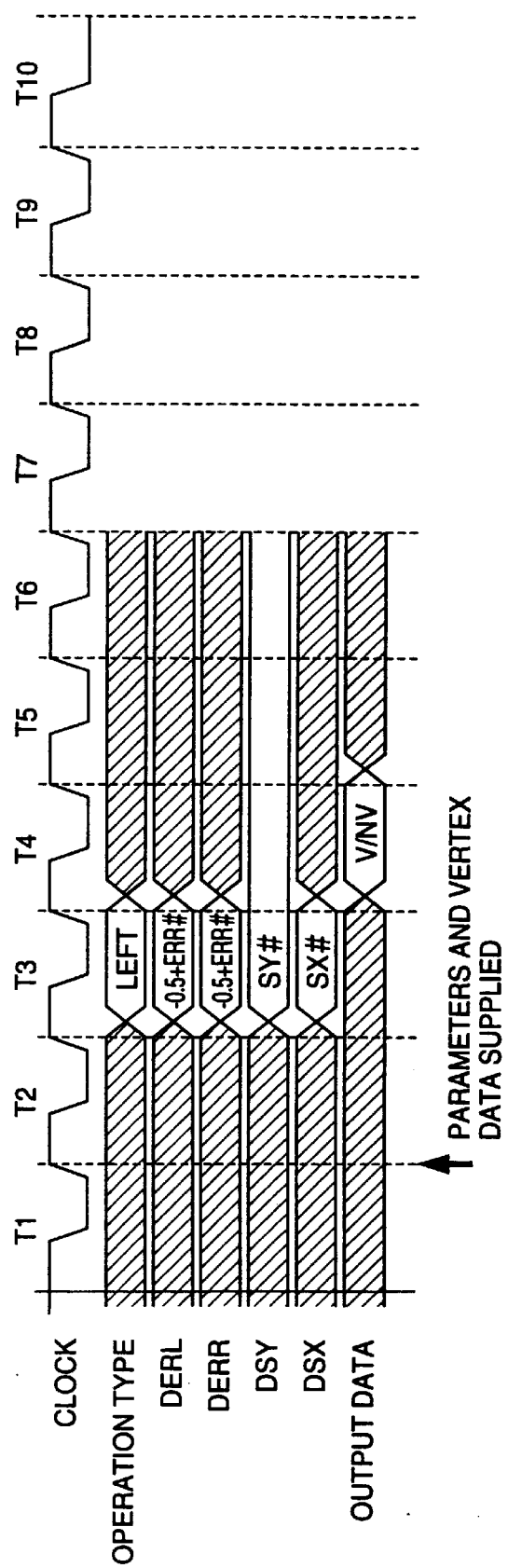
FIG. 7 is a time chart for explaining a starting condition of the drawing processor of FIG. 3 when the drawing processing for a polygon is started.

FIG. 7 is a time chart for explaining a starting condition of the drawing processor of FIG. 3 when the drawing processing for a polygon is started.

Hereinafter, in FIG. 7 through FIG. 15, a clock cycle, an operation type of the 3-input DDA unit 11, values of the registers DERL, DERR, DSY and DSX, and an output data condition of the 3-input DDA unit 11 are shown. In FIG. 7 through FIG. 15, "V/NV" in the output data condition indicates that the pixel data output by the 3-input DDA unit 11 is valid or not valid.

Before a DDA processing of the DDA operation part 21 is started, the parameter computation unit 10 calculates the parameters in the above-described manner.

As shown in FIG. 7, on the rising edge (indicated by the arrow in FIG. 7) of the clock cycle T2, the parameter computation unit 10 supplies the parameters (dSZX, dSZY, dCLX, dCLY, ERR0, ERR1, ERR2) and the polygon data (SX#, SY#, SZ#, CL#) to the input data part 20 of the 3-input DDA unit 11, wherein the suffix character "#" denotes one of the integers 0, 1 and 2 corresponding to the vertices A, B and C of the polygon.

During the clock cycle T3, the 3-input DDA unit 11 performs the left DDA processing, and the operation type thereof is set to the "left". The polygon data (SX#, SY#, SZ#, CL#) of one of the vertices with the smallest y-coordinate are supplied to the DDA operation circuits 25 through 28. The corresponding error values ERR# are supplied to the DDA operation circuits 29 and 30. For example, in the case of the polygon (the triangle ABC) of FIG. 4, the polygon data (SX0, SY0, SZ0, CL0) of the vertex A are supplied to the DDA operation circuits 25 through 28, the error values (ERR0, ERR2) of the edges AB and AC are supplied to the DDA operation circuits 29 and 30.

The DDA operation circuit 29 adds "−0.5" to the error value ERR#, and stores the resulting value in the register DERL. The DDA operation circuit 30 adds "−0.5" to the error value ERR#, and stores the resulting value in the register DERR. The DDA operation circuit 25 stores the y-coordinate SY# in the register DSY, and the DDA operation circuit 26 stores the x-coordinate SX# in the register DSX.

During the clock cycle T4, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

Figure 8:
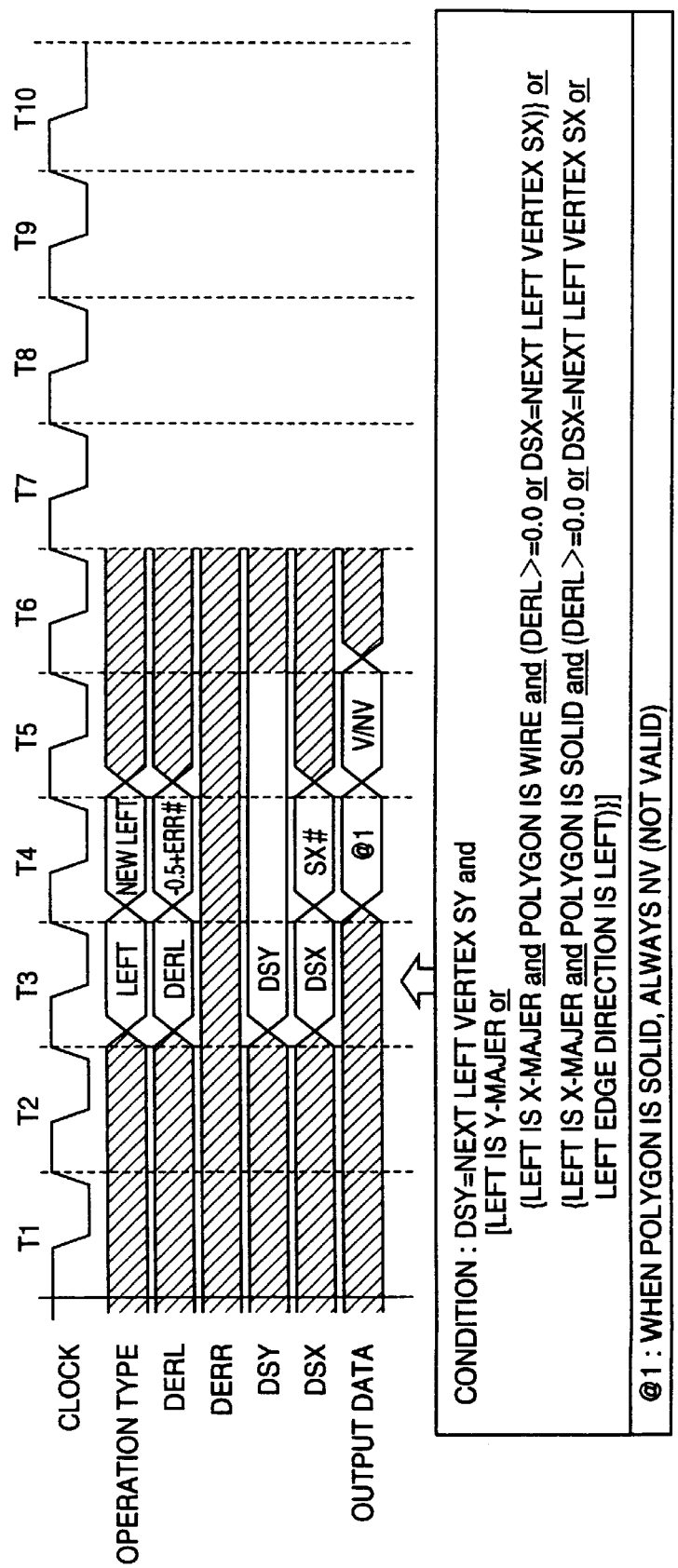
FIG. 8 is a time chart for explaining a condition of the drawing processor of FIG. 3 when a "left" DDA processing is changed to a next "left" DDA processing.

FIG. 8 shows a condition of the drawing processor of FIG. 3 when a left DDA processing is changed to a next left DDA processing.

Figure 16A:
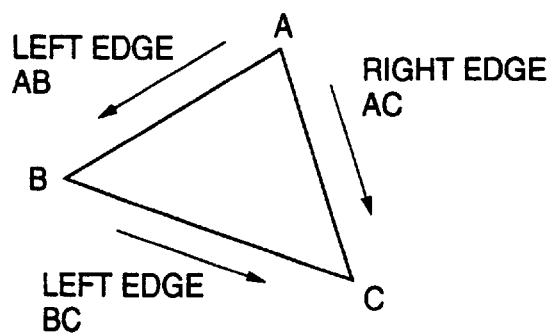
FIG. 16A and FIG. 16B are diagrams for explaining edges of a polygon.

As described above, the DDA control unit 13 makes a determination as to whether a predetermined condition for changing a left DDA processing to a next left DDA processing is satisfied. This situation of the 3-input DDA unit 11 occurs in a case in which the polygon ABC has the left edge AB and the left edge BC, as shown in FIG. 16A, and the left DDA processing for the left edge AB ends and the DDA processing for the left edge BC is started.

As shown in FIG. 8, during the clock cycle T3, the DDA control unit 13 determines whether at least one of the following conditions (1) through (6) is satisfied, based on the values of the registers DERL, DSY and DSX, the gradient parameters and the signs of the work buffers and the polygon data (for the sake of convenience, a description of the following conditions will be given with reference to the polygon ABC of FIG. 16A):

(1) The value of the register DSY indicates the y-coordinate of the vertex B, and the y-major is chosen for the gradient parameter of the edge AB;

(2) The value of the register DSY indicates the y-coordinate of the vertex B, the x-major is chosen for the gradient parameter of the edge AB, the polygon is a wire-frame model, and the value of the register DERL is positive;

(3) The value of the register DSY indicates the y-coordinate of the vertex B, the x-major is chosen for the gradient parameter of the edge AB, the polygon is a wire-frame model, and the value of the register DSX indicates the x-coordinate of the vertex B;

(4) The value of the register DSY indicates the y-coordinate of the vertex B, the x-major is chosen for the gradient parameter of the edge AB, the polygon is a solid model, and the value of the register DERL is positive;

(5) The value of the register DSY indicates the y-coordinate of the vertex B, the x-major is chosen for the gradient parameter of the edge AB, the polygon is a solid model, and the value of the register DSX indicates the x-coordinate of the vertex B; and (6) The value of the register DSY indicates the y-coordinate of the vertex B, the x-major is chosen for the gradient parameter of the edge AB, the polygon is a solid mode, and the direction of the edge AB is left.

Figure 17A:
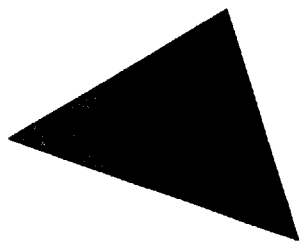
FIG. 17A and FIG. 17B are diagrams for explaining a solid model of a polygon and a wire-frame model of a polygon.
Figure 17B:
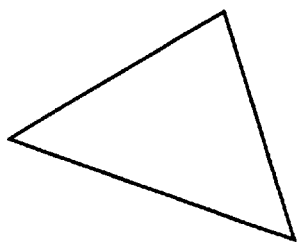

With respect to the above-mentioned conditions, FIG. 17A and FIG. 17B show a solid model of a polygon and a wire-frame model of a polygon. When the polygon to be processed is a solid model shown in FIG. 17A, the 3-input DDA unit 11 selectively performs one of the left DDA processing, the right DDA processing and the middle DDA processing in a controlled sequence based on the parameters and the polygon data, and outputs pixel data for one of dots on a scan line substantially every time the selected DDA processing is performed. On the other hand, when the polygon to be processed is a wire-frame model shown in FIG. 17B, the 3-input DDA unit 11 performs selectively one of the left DDA processing and the right DDA processing in a controlled sequence based on the parameters and the polygon data, and outputs pixel data for one of dots near the polygon left edge or the polygon right edge. However, in the case of the wire-frame model, the 3-input DDA unit 11 does not perform the middle DDA processing, and does not output pixel data for one of intermediate dots between the polygon left edge and the polygon right edge.

When the DDA control unit 13 determines that at least one of the above conditions (1) through (6) is satisfied, the DDA control unit 13 controls the 3-input DDA unit 11 so as to start the next left DDA processing for a next edge of the polygon.

During the clock cycle T4, a new error value ERR# for the next edge BC is supplied to the DDA operation circuit 29. The DDA operation circuit 29 adds "−0.5" to the new error value ERR#, and stores the resulting value in the register DERL. The DDA operation circuits 26 through 28 perform the next left DDA processing for the next edge BC. For example, the DDA operation circuit 26 stores the resulting x-coordinate SX# in the register DSX.

During the clock cycle T5, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

When the polygon is a solid model during the clock cycle T4 (indicated by "@1" in FIG. 8), the pixel data stored in the registers SY, SX, DSZ and DCL during the preceding cycle are not output to the frame memory 5. The output data condition in such a case is set at "NV (not valid)". On the other hand, when the polygon is a wire-frame model during the clock cycle T4, the pixel data stored in the registers SY, SX, DSZ and DCL during the preceding cycle are output to the frame memory 5. The output data condition in such a case is set at "V (valid)".

Figure 9:
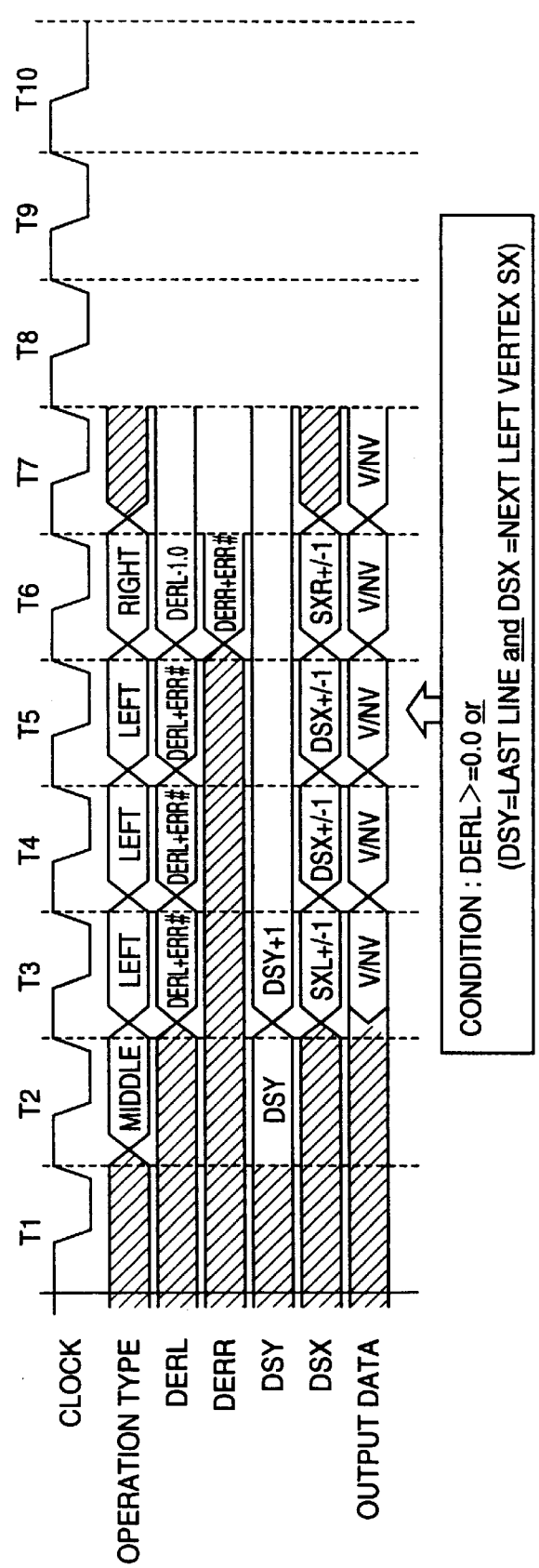
FIG. 9 is a time chart for explaining a condition of the drawing processor of FIG. 3 when a gradient parameter of a polygon left edge indicates the x-major and a "left" DDA processing is changed to a "right" DDA processing.

FIG. 9 shows a condition of the drawing processor of FIG. 3 when a gradient parameter of a polygon left edge indicates the x-major and a left DDA processing is changed to a right DDA processing.

The DDA control unit 13 first makes a determination as to whether the gradient parameter of the related edge indicates the x-major. When the gradient parameter of the related edge indicates the x-major, the DDA control unit 13 makes a determination as to whether a predetermined condition for changing a left DDA processing to a right DDA processing is satisfied.

As shown in FIG. 9, during the clock cycle T5, the DDA control unit 13 determines whether at least one of the following conditions (1) and (2) is satisfied, based on the values of the registers DERL, DSY and DSX and the polygon data (the sake of convenience, a description of the following conditions will be given with reference to the polygon ABC of FIG. 16A):

(1) The value of the register DERL is positive; and
(2) The value of the register DSY indicates the last scan line, and the value of the register DSX indicates the x-coordinate of the vertex C.

When the DDA control unit 13 determines that w at least one of the above conditions (1) and (2) is satisfied, the DDA control unit 13 controls the 3-input DDA unit 11 so as to start the right DDA processing for the next edge of the polygon.

During the clock cycle T6, the DDA operation circuit 29 adds "−1" to the error value DERL, and stores the resulting value in the register DERL. The DDA operation circuit 30 adds the value of the register DERR and the error value ERR#, and stores the resulting value in the register DERR. The DDA operation circuits 26 through 28 perform the right DDA processing for the next edge. For example, the DDA operation circuit 26 adds one of "+1", "0" and "−1" to the value of the register SXR, and stores the resulting value in the register DSX.

During the clock cycle T7, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

Figure 10:
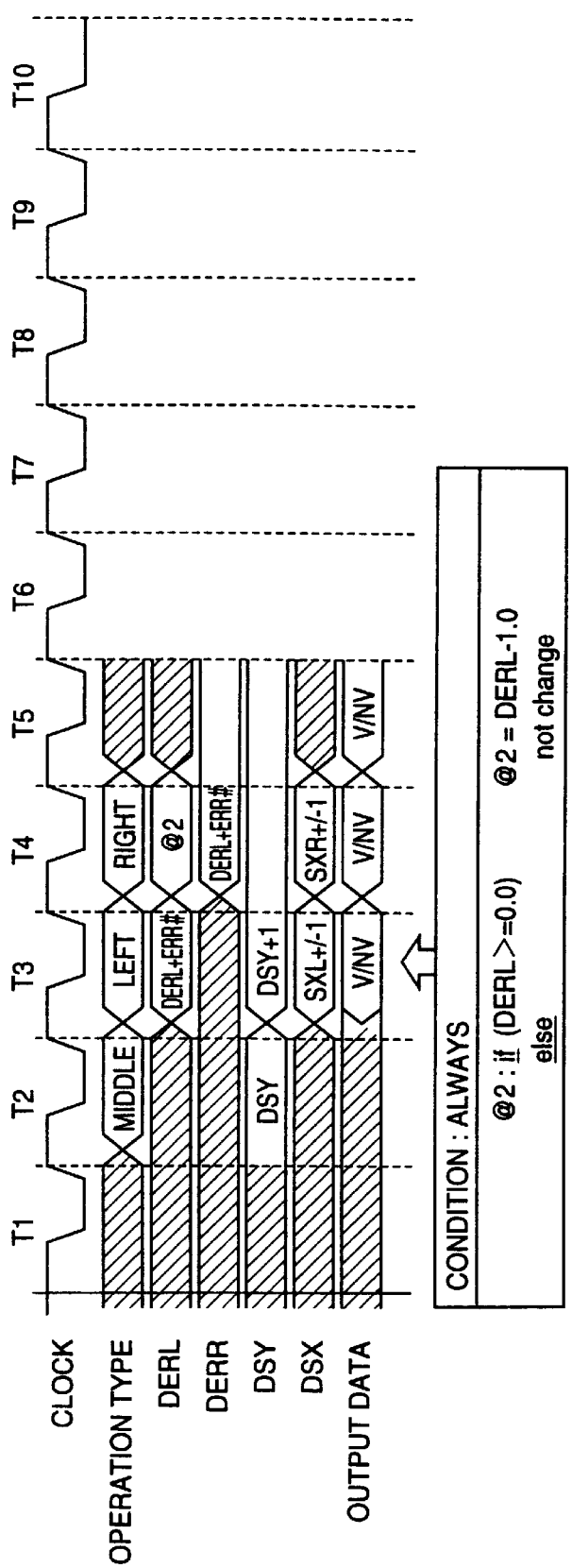
FIG. 10 is a time chart for explaining a condition of the drawing processor of FIG. 3 when a gradient parameter of a polygon left edge indicates the y-major and a "left" DDA processing is changed to a "right" DDA processing.

FIG. 10 shows a condition of the drawing processor of FIG. 3 when a gradient parameter of a polygon left edge indicates the y-major and a left DDA processing is changed to a right DDA processing.

The DDA control unit 13 first makes a determination as to whether the gradient parameter of the related edge indicates the y-major. When the gradient parameter of the related edge indicates the y-major, the DDA control unit 13 controls the 3-input DDA unit 11 such that the 3-input DDA unit 11 performs a left DDA processing only once for a single scan line.

As shown in FIG. 10, after the left DDA processing is performed during the clock cycle T3, the 3-input DDA unit 11 always performs the right DDA processing during the clock cycle T4 without taking account of a condition for changing a left DDA processing to a right DDA processing.

During the clock cycle T4, if the value of the register DERL is positive, the DDA operation circuit 29 adds "−1" to the error value DERL and stores the resulting value in the register DERL as indicated by "@2" in FIG. 10. If the value of the register DERL is not positive, the value of the register DERL remains unchanged as indicated by "@2" in FIG. 10.

The DDA operation circuit 30 adds the value of the register DERR and the error value ERR#, and stores the resulting value in the register DERR. The DDA operation circuits 26 through 28 perform the right DDA processing for the next edge. For example, the DDA operation circuit 26 adds one of "+1", "0" and "−1" to the value of the register SXR, and stores the resulting value in the register DSX.

During the clock cycle T5, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

Figure 11:
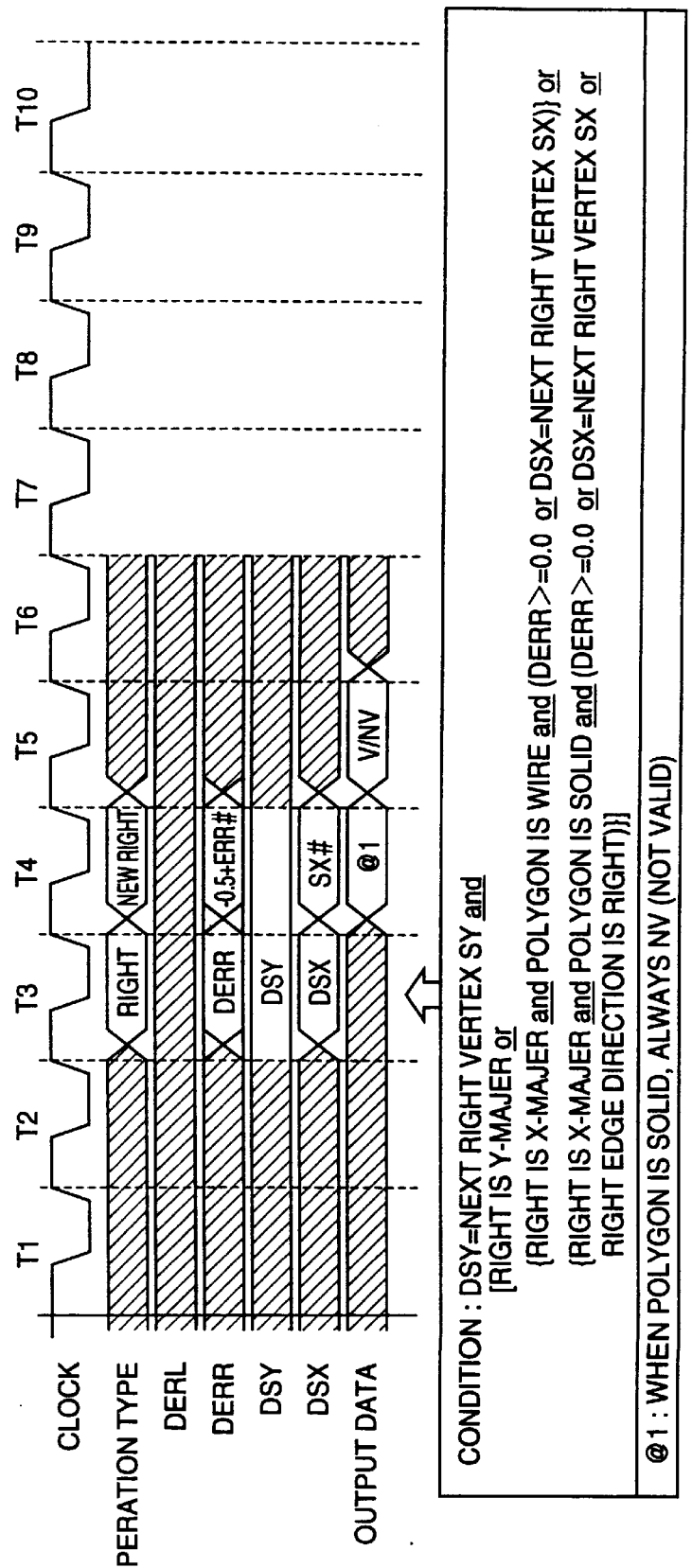
FIG. 11 is a time chart for explaining a condition of the drawing processor of FIG. 3 when a "right" DDA processing is changed to a next "right" DDA processing.

FIG. 11 shows a condition of the drawing processor of FIG. 3 when a right DDA processing is changed to a next right DDA processing.

Figure 16B:
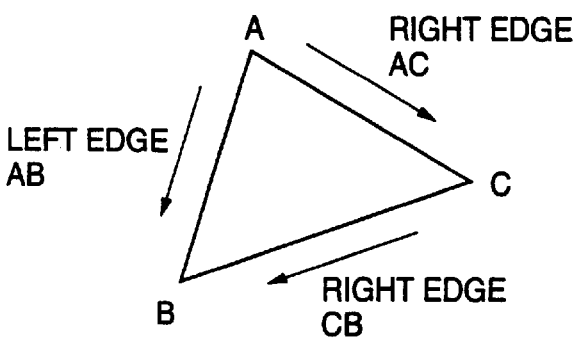

As described above, the DDA control unit 13 makes a determination as to whether a predetermined condition for changing a right DDA processing to a next right DDA processing is satisfied. This situation of the 3-input DDA unit 11 occurs in a case in which the polygon ABC has the right edge AC and the right edge CB, as shown in FIG. 16B, and the right DDA processing for the right edge AC ends and the right DDA processing for the right edge CB is started.

As shown in FIG. 11, during the clock cycle T3, the DDA control unit 13 determines whether at least one of the following conditions (1) through (6) is satisfied, based on the values of the registers DERL, DSY and DSX, the gradient parameters and the signs of the work buffers and the polygon data (for the sake of convenience, a description of the following conditions will be given with reference to the polygon ABC of FIG. 16B);

(1) The value of the register DSY indicates the y-coordinate of the vertex C, and the y-major is chosen for the gradient parameter of the edge AC;

(2) The value of the register DSY indicates the y-coordinate of the vertex C, the x-major is chosen for the gradient parameter of the edge AC, the polygon is a wire-frame model, and the value of the register DERR is positive;

(3) The value of the register DSY indicates the y-coordinate of the vertex C, the x-major is chosen for the gradient parameter of the edge AC, the polygon is a wire-frame model, and the value of the register DSX indicates the x-coordinate of the vertex C;

(4) The value of the register DSY indicates the y-coordinate of the vertex C, the x-major is chosen for the gradient parameter of the edge AC, the polygon is a solid model, and the value of the register DERR is positive;

(5) The value of the register DSY indicates the y-coordinate of the vertex C, the x-major is chosen for the gradient parameter of the edge AC, the polygon is a solid model, and the value of the register DSX indicates the x-coordinate of the vertex C; and (6) The value of the register DSY indicates the y-coordinate of the vertex C, the x-major is chosen for the gradient parameter of the edge AC, the polygon is a solid mode, and the direction of the edge AC is right.

When the DDA control unit 13 determines that at least one of the above conditions (1) through (6) is satisfied, the DDA control unit 13 controls the 3-input DDA unit 11 so as to start the next right DDA processing for a next edge of the polygon.

During the clock cycle T4, a new error value ERR# for the next edge BC is supplied to the DDA operation circuit 30.

The DDA operation circuit 30 adds "−0.5" to the new error value ERR#, and stores the resulting value in the register DERR. The DDA operation circuits 26 through 28 perform the next right DDA processing for the next edge CB. For example, the DDA operation circuit 26 stores the resulting x-coordinate SX# in the register DSX.

During the clock cycle T5, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

When the polygon is a solid model during the clock cycle T4 (indicated by "@1" in FIG. 11), the pixel data stored in the registers SY, SX, DSZ and DCL during the preceding cycle are not output to the frame memory 5. The output data condition in such a case is set at "NV (not valid)". On the other hand, when the polygon is a wire-frame model during the clock cycle T4, the pixel data stored in the registers SY, SX, DSZ and DCL during the preceding cycle are output to the frame memory 5. The output data condition in such a case is set at "V (valid)".

Figure 12:
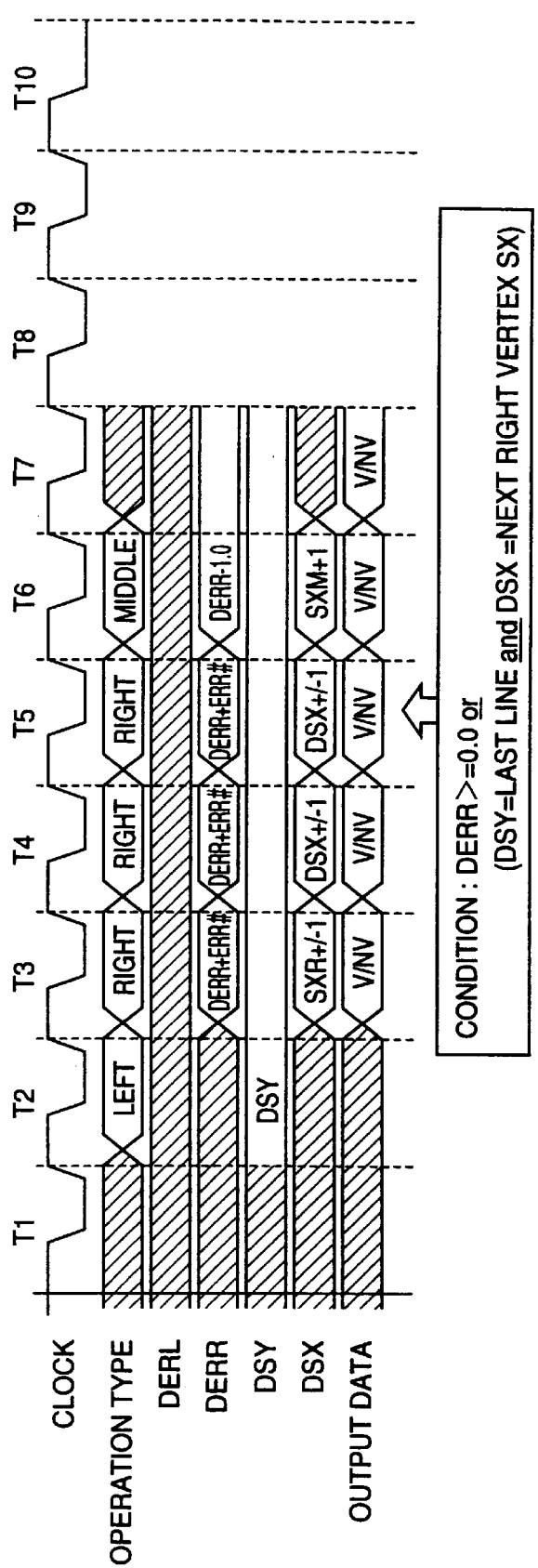
FIG. 12 is a time chart for explaining a condition of the drawing processor of FIG. 3 when a gradient parameter of a polygon right edge indicates the x-major and a "right" DDA processing is changed to a "middle" DDA processing.

FIG. 12 shows a condition of the drawing processor of FIG. 3 when a gradient parameter of a polygon right edge indicates the x-major and a right DDA processing is changed to a middle DDA processing.

The DDA control unit 13 first makes a determination as to whether the gradient parameter of the related edge indicates the x-major. When the gradient parameter of the related edge indicates the x-major, the DDA control unit 13 makes a determination as to whether a predetermined condition for changing a right DDA processing to a middle left DDA processing is satisfied.

As shown in FIG. 12, during the clock cycle T5, the DDA control unit 13 determines whether at least one of the following conditions (1) and (2) is satisfied, based on the values of the registers DERR, DSY and DSX and the polygon data (the sake of convenience, a description of the following conditions will be given with reference to the polygon ABC of FIG. 16B):

(1) The value of the register DERR is positive; and (2) The value of the register DSY indicates the last scan line, and the value of the register DSX indicates the x-coordinate of the vertex B.

When the DDA control unit 13 determines that at least one of the above conditions (1) and (2) is satisfied, the DDA control unit 13 controls the 3-input DDA unit 11 so as to start the right DDA processing for the next edge of the polygon.

During the clock cycle T6, the DDA operation circuit 30 adds "−1" to the error value DERR in the preceding cycle, and stores the resulting value in the register DERR. The DDA operation circuits 26 through 28 perform the middle DDA processing for the next edge. For example, the DDA operation circuit 26 adds "+1" to the value of the register SXM, and stores the resulting value in the register DSX.

During the clock cycle T7, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

Figure 13:
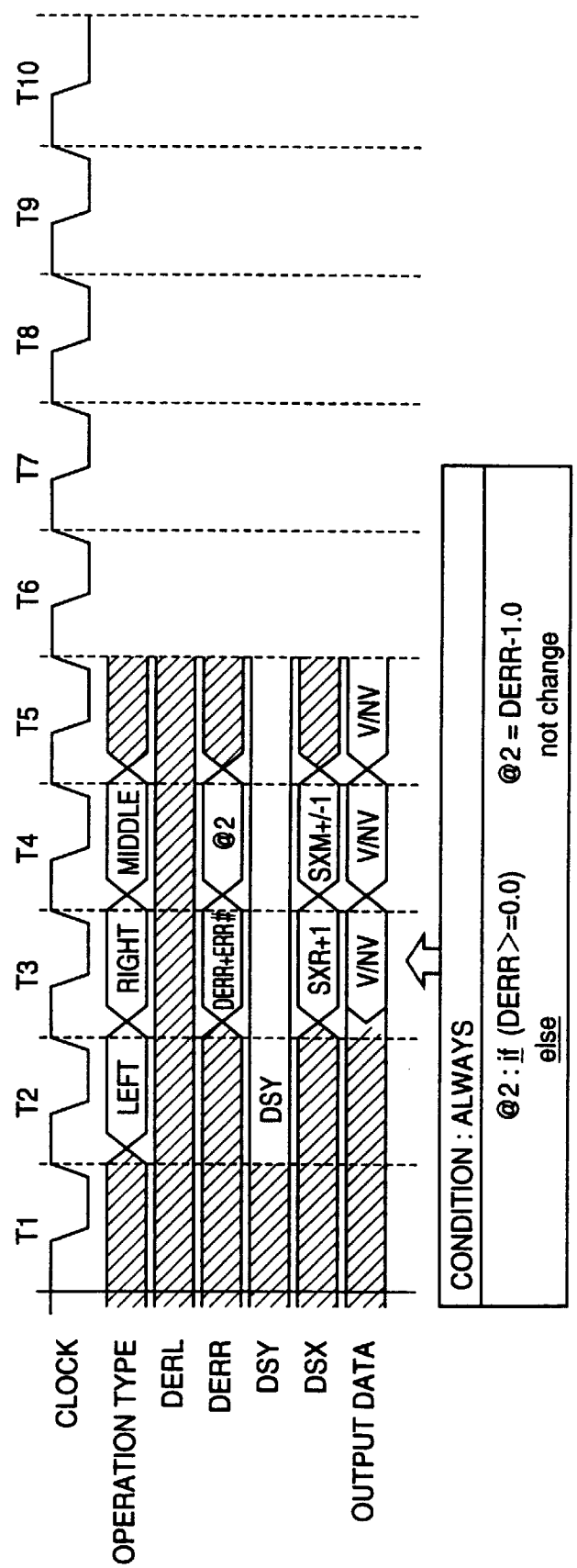
FIG. 13 is a time chart for explaining a condition of the drawing processor of FIG. 3 when a gradient parameter of a polygon right edge indicates the y-major and a "right" DDA processing is changed to a "middle" DDA processing.

FIG. 13 shows a condition of the drawing processor of FIG. 3 when a gradient parameter of a polygon right edge indicates the y-major and a right DDA processing is changed to a middle DDA processing.

The DDA control unit 13 first makes a determination as to whether the gradient parameter of the related edge indicates the y-major. When the gradient parameter of the related edge indicates the y-major, the DDA control unit 13 controls the 3-input DDA unit 11 such that the 3-input DDA unit 11 performs a right DDA processing only once for a single scan line.

As shown in FIG. 13, after the right DDA processing is performed during the clock cycle T3, the 3-input DDA unit 11 always performs the middle DDA processing during the clock cycle T4 without taking account of a condition for changing a right DDA processing to a middle DDA processing.

During the clock cycle T4, if the value of the register DERR is positive, the DDA operation circuit 30 adds "−1" to the error value DERR and stores the resulting value in the register DERR as indicated by "@2" in FIG. 13. If the value of the register DERR is not positive, the value of the register DERR remains unchanged as indicated by "@2" in FIG. 13. The DDA operation circuits 26 through 28 perform the middle DDA processing for the next edge. For example, the DDA operation circuit 26 adds "+1" to the value of the register SXM, and stores the resulting value in the register DSX.

During the clock cycle T5, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

Figure 14:
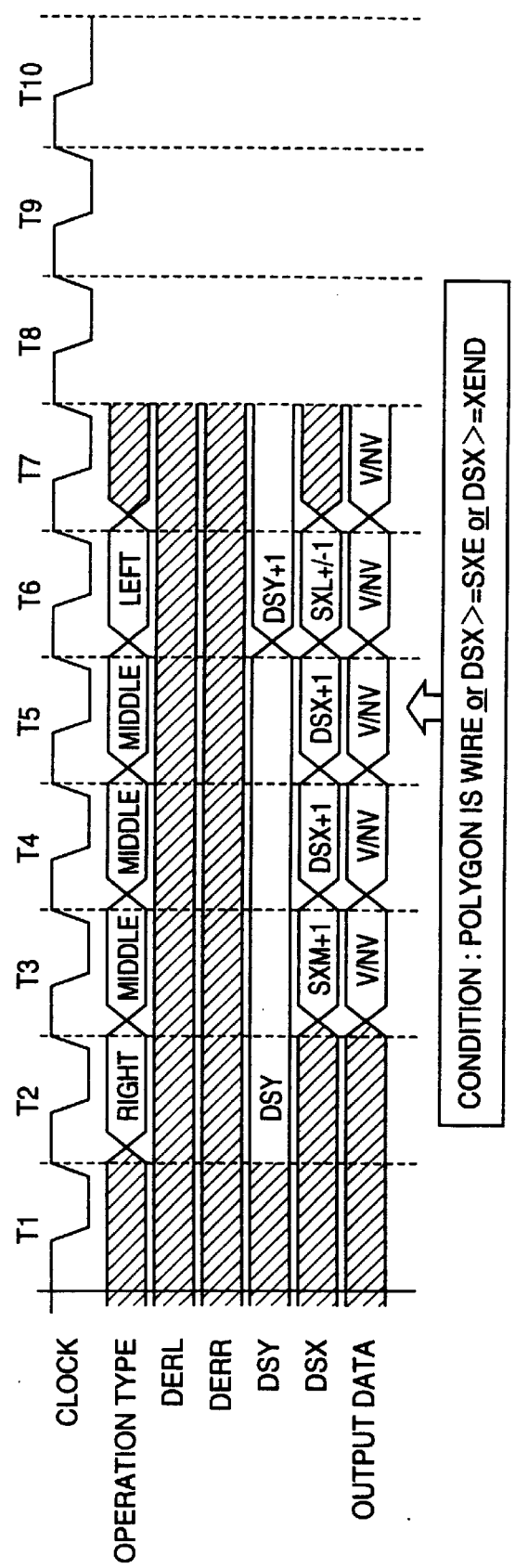
FIG. 14 is a time chart for explaining a condition of the drawing processor of FIG. 3 when a "middle" DDA processing is changed to a "left" DDA processing.

FIG. 14 shows a condition of the drawing processor of FIG. 3 when a middle DDA processing is changed to a left DDA processing.

When a middle DDA processing for dots on a scan line is performed by the 3-input DDA unit 11, the DDA control unit 13 makes a determination as to whether a predetermined condition for changing the middle DDA processing to a left DDA processing for dots on a next scan line is satisfied.

As shown in FIG. 14, during the clock cycle T5, the DDA control unit 13 determines whether at least one of the following conditions (1) through (3) is satisfied:

(1) The polygon is a wire-frame model;
(2) The value of the register DSX is above the value of the register SXE; and
(3) The value of the register DSX is above a maximum x-coordinate XEND of the CRT monitor 6 on the screen coordinate system.

When the DDA control unit 13 determines that at least one of the above conditions (1) through (3) is satisfied, the DDA control unit 13 controls the 3-input DDA unit 11 so as to start the left DDA processing for the dots on the next scan line.

During the clock cycle T6, the DDA operation circuit 25 adds "+1" to the value of the register DSY and stores the resulting value in the register DSY. The DDA operation circuit 26 adds one of "+1", "0" and "−1" to the value of the register SXL and stores the resulting value in the register DSX. Similarly, the DDA operation circuits 27 and 28 performs the left DDA processing.

During the clock cycle T7, the pixel data, including the y-coordinate, the x-coordinate, the z-value and the color value, stored in the registers SY, SX, DSZ and DCL, are supplied through the pixel buffer 12 to the frame memory 5. The output data condition of the 3-input DDA unit 11 in such a case is set at the "V/NV".

Figure 15:
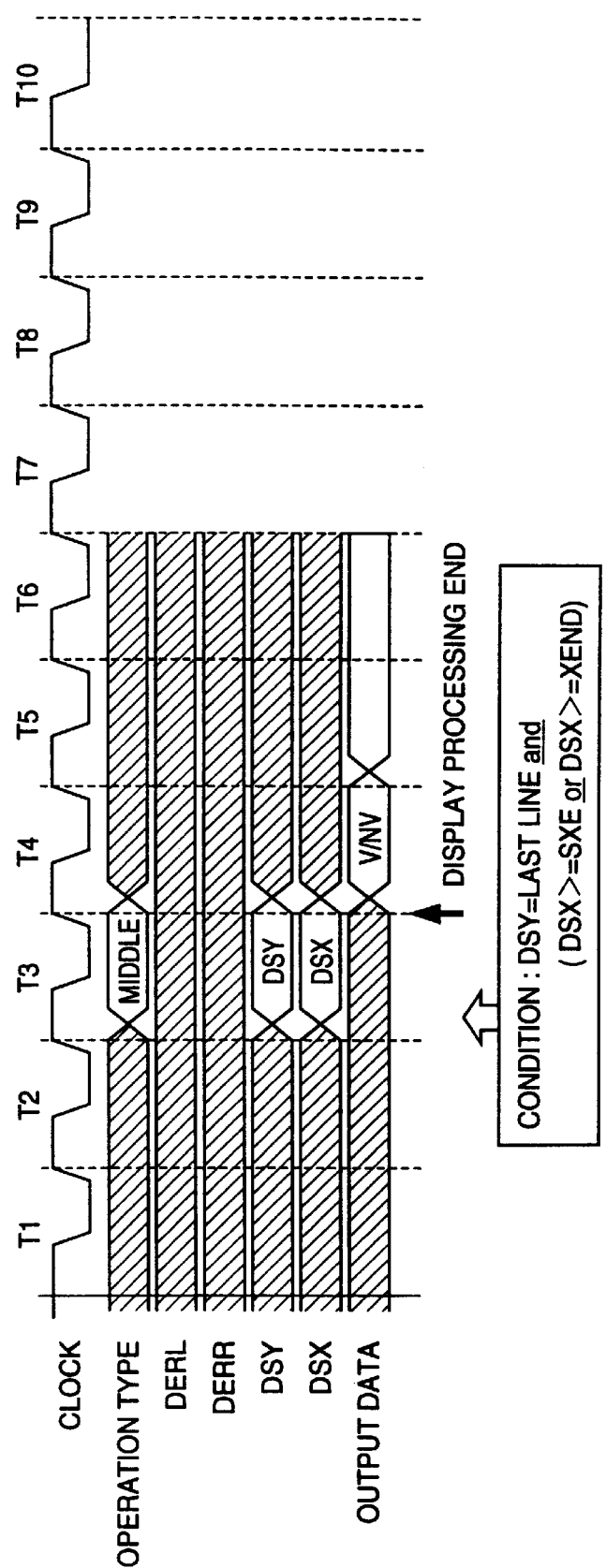
FIG. 15 is a time chart for explaining a condition of the drawing processor of FIG. 3 when the drawing processing for the polygon ends.

FIG. 15 shows a condition of the drawing processor of FIG. 3 when the drawing processing for the polygon ends.

As described above, the final DDA processing for dots on a scan line, performed by the 3-input DDA unit 11, is the middle DDA processing. Hence, when a middle DDA processing for dots on the last scan line is performed by the 3-input DDA unit 11, the DDA control unit 13 makes a determination as to whether a predetermined condition for terminating the drawing processing for the polygon is satisfied.

As shown in FIG. 15, during the clock cycle T3, the DDA control unit 13 determines whether at least one of the following conditions (1) and (2) is satisfied:

(1) The value of the register DSY indicates the y-coordinate of the last scan line for the polygon, and the value of the register DSX is above the value of the register SXE; and
(2) The value of the register DSY indicates the y-coordinate of the last scan line for the polygon, and the value of the register DSX is above the maximum x-coordinate XEND of the CRT monitor 6 on the screen coordinate system.

When the DDA control unit 13 determines that at least one of the above conditions (1) and (2) is satisfied, the DDA control unit 13 controls the 3-input DDA unit 11 so as to terminate the drawing processing for the polygon. During the clock cycle T4, the pixel data, including the y-coordinate, the x-coordinate, the z-value and the color value, stored in the registers SY, SX, DSZ and DCL in the preceding cycle, are supplied through the pixel buffer 12 to the frame memory 5. The output data condition of the 3-input DDA unit 11 in such a case is set at the "V/NV". The last scan line is determined by either the largest y-coordinate for one of the vertices of the polygon or a maximum y-coordinate YEND of the CRT monitor 6 on the screen coordinate system.

Figure 18:
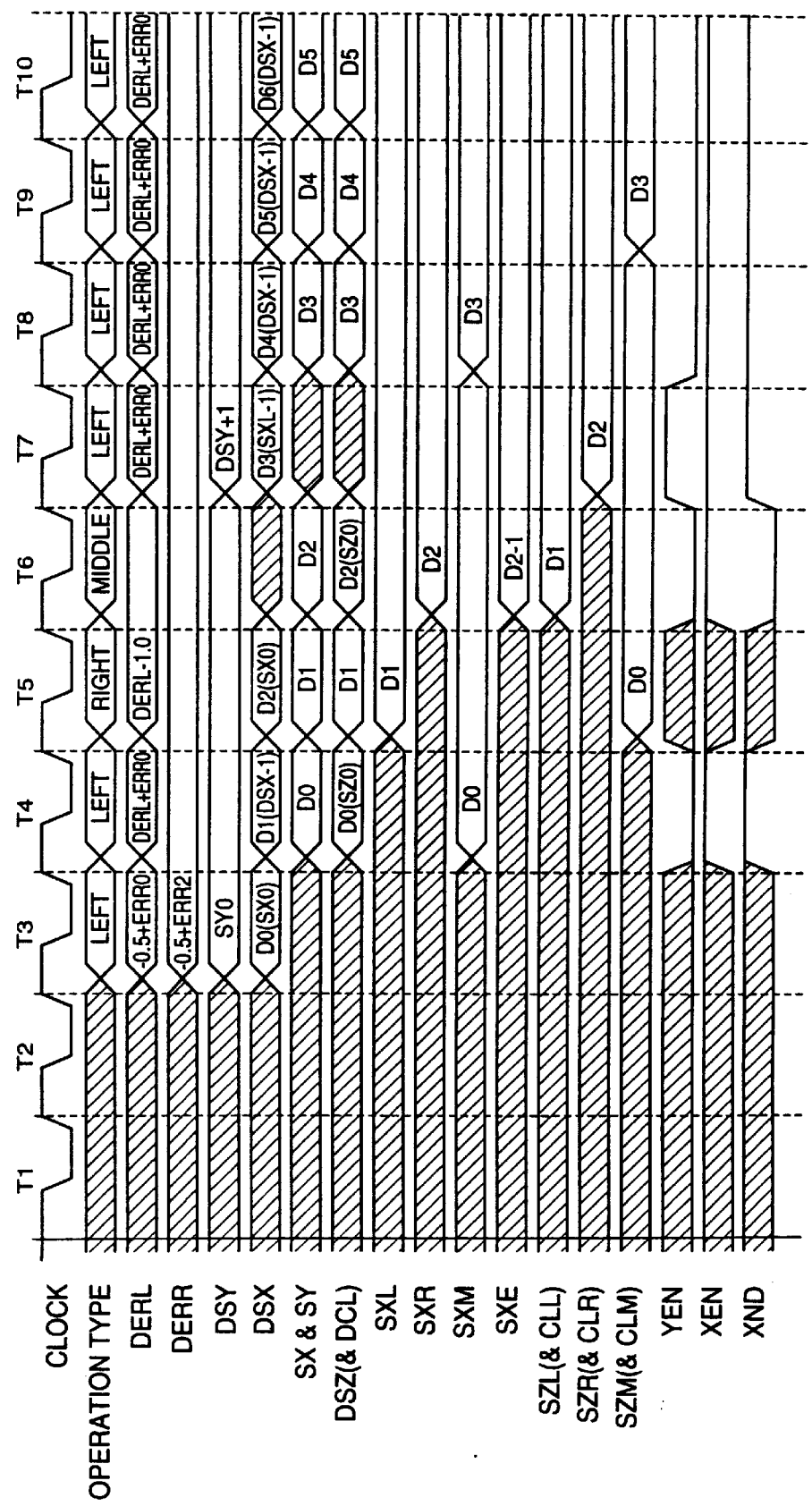
FIG. 18 is a time chart for explaining a condition of the drawing processor of FIG. 3 when the drawing processing for a polygon shown in FIG. 4 is performed.
Figure 19:
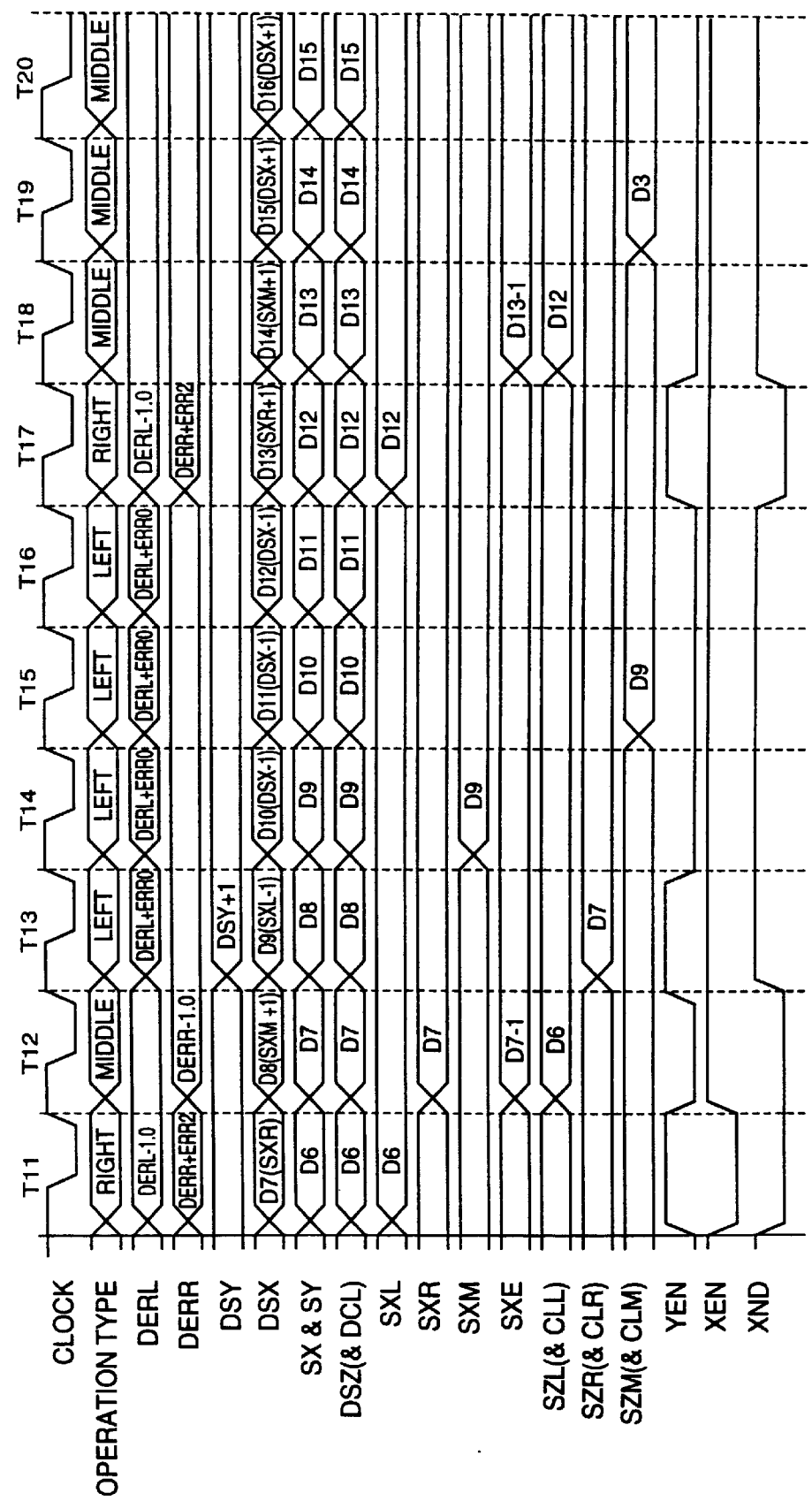
FIG. 19 is a time chart for explaining the condition of the drawing processor of FIG. 3 when the drawing processing is subsequently performed after the condition of FIG. 18.

FIG. 18 is a time chart for explaining a condition of the drawing processor of FIG. 3 when the DDA processing is performed for polygon data shown in FIG. 4. FIG. 19 is a time chart for explaining the condition of the drawing processor of FIG. 3 when the DDA processing is subsequently performed after the condition of FIG. 18.

Before the end of the clock cycle T2 (or before the DDA processing of the 3-input DDA unit 11 is started), the parameter computation unit 10 calculates the parameters. As shown in FIG. 18, on the rising edge of the clock cycle T2, the parameter computation unit 10 supplies both the parameters (dSZX, dSZY, dCLX, dCLY, ERR0, ERR1, ERR2) and the polygon data (SX#, SY#, SZ#, CL#) to the 3-input DDA unit 11, wherein the suffix character "#" denotes one of the integers 0, 1 and 2 corresponding to the vertices A, B and C of the polygon. Further, in the case of the polygon data of FIG. 4, the parameter computation unit 10 chooses the x-major for the gradient parameter of the edge AB, chooses the x-major for the gradient parameter of the edge BC, and chooses the y-major for the gradient parameter of the edge AC. Further, the parameter computation unit 10 determines the sign of the gradient parameter of the edge AB as being negative (the left-hand down slope), determines the sign of the gradient parameter of the edge BC as being positive (the right-hand down slope), and determines the sign of the gradient parameter of the edge AC as being positive (the right-hand down slope). The gradient parameters and the signs for the polygon edges AB, BC and AC are stored in the work buffers (not shown) of the DDA control unit 13.

During the clock cycle T3, the y-coordinate (SY0) and the x-coordinate (SX0) of the vertex A (the white dot 0 of FIG. 4) are supplied to the DDA operation circuit 25 and the DDA operation circuit 26. The DDA operation circuits 25 and 26 perform the "left" DDA processing and store the results of the "left" DDA processing in the registers DSY and DSX. The DDA operation circuit 29 adds "−0.5" to the error value ERR0 of the edge AB and stores the resulting value in the register DERL. The DDA operation circuit 30 adds "−0.5" to the error value ERR2 of the edge AC and stores the resulting value in the register DERR.

During the clock cycle T4, the coordinates in the registers DSY and DSX of the DDA operation circuits 25 and 26 are stored in the registers SY and SX. The z-value (SZ0) and the color value (CL0) of the vertex A are supplied to the DDA operation circuits 27 and 28. The DDA operation circuits 27 and 28 perform the "left" DDA processing and store the results of the "left" DDA processing in the registers DSZ and DCL. The pixel data (D0), including the y-coordinate, the x-coordinate, the z-value and the color value of the vertex A, which are stored in the registers SY, SX, DSZ and DCL, are supplied through the pixel buffer 12 to the frame memory 5.

Further, during the clock cycle T4, the DDA control unit 13 determines that any of the conditions for changing the "left" DDA processing to another is not satisfied, and controls the 3-input DDA unit 11 so as to continue the "left" DDA processing. The operation type of the 3-input DDA unit 11 is set to the "left" DDA processing by the DDA control unit 13. The DDA operation circuits 25 and 26 perform the "left" DDA processing based on the coordinates stored in the registers DSY and DSX, and stores the results of the "left" DDA processing in the registers DSY and DSX. Specifically, the DDA operation circuit 25 stores the y-coordinate of the white dot 0 (or the vertex A) of FIG. 4 in the register DSY without changing the coordinate. The DDA operation circuit 26 subtracts 1 from the x-coordinate of the white dot 0 of FIG. 4 and stores the resulting value in the register DSX. The DDA operation circuit 29 adds the error value ERR0 to the value in the register DERL and stores the resulting value in the register DERL.

During the clock cycle T5, the coordinates in the registers DSY and DSX of the DDA operation circuits 25 and 26 are stored in the registers SY and SX. The DDA operation circuits 27 and 28 perform the "left" DDA processing based on the values stored in the registers DSY and DSX. The DDA control unit 13 sets the signal YEN at the low level and sets both the signal XEN and the signal XND at the high level. Hence, the DDA operation circuit 27 subtracts the value dSZX from the value of the register DSZ and stores the resulting value in the register DSZ, and the DDA operation circuit 28 subtracts the value dCLX from the value of the register DCL and stores the resulting value in the register DCL. The pixel data (D1), including the y-coordinate, the x-coordinate, the z-value and the color value of the white dot 1 of FIG. 4, which are stored in the registers SY, SX, DSZ and DCL, are supplied through the pixel buffer 12 to the frame memory 5.

Further, during the clock cycle T5, the DDA control unit 13 determines that one of the conditions for changing the "left" DDA processing to the "right" DDA processing is satisfied, and controls the 3-input DDA unit 11 so as to perform the "right" DDA processing. The operation type of the 3-input DDA unit 11 is set to the "right" DDA processing by the DDA control unit 13. The y-coordinate (SY0) and the x-coordinate (SX0) of the white dot 2 of FIG. 4 (or the vertex A) are supplied to the DDA operation circuits 25 and 26. The DDA operation circuits 25 and 26 perform the "right" DDA processing based on the coordinates stored in the registers DSY and DSX, and stores the results of the "right" DDA processing in the registers DSY and DSX. The DDA operation circuit 29 adds "−1" to the value of the register DERL and stores the resulting value in the register DERL.

During the clock cycle T6, the coordinates in the registers DSY and DSX of the DDA operation circuits 25 and 26 are stored in the registers SY and SX. The DDA operation circuits 27 and 28 perform the "right" DDA processing and store the results of the "right" DDA processing in the registers DSZ and DCL. The pixel data (D2), including the y-coordinate, the x-coordinate, the z-value and the color value of the white dot 2 (the vertex A) of FIG. 4, which are stored in the registers SY, SX, DSZ and DCL, are supplied through the pixel buffer 12 to the frame memory 5.

As described above, the parameter computation unit 10 chooses the y-major for the gradient parameter of the edge AC. Hence, during the clock cycle T6, the DDA control unit 13 determines that one of the conditions for changing the "right" DDA processing to the "middle" DDA processing is satisfied, and controls the 3-input DDA unit 11 so as to perform the "middle" DDA processing. The operation type of the 3-input DDA unit 11 is set to the "middle" DDA processing by the DDA control unit 13. However, during the clock cycle T6, the DDA control unit 13 further determines that one of the conditions for changing the "middle" DDA processing to the "left" DDA processing is satisfied, and controls the 3-input DDA unit 11 so as to perform the "left" DDA processing. Therefore, the 3-input DDA unit 11 does not perform the "middle" DDA processing during the clock cycle T6.

As shown in FIG. 18 and FIG. 19, during the clock cycles T7 through T12, the 3-input DDA unit 11 performs one of the "left" DDA processing, the "right" DDA processing and the "middle" DDA processing for the next scan line successively on the order of "left", "right" and "middle". Hence, the pixel data D3 through D7 (each of which includes the y-coordinate, the x-coordinate, the z-value and the color value) corresponding to the dots 3 through 7 of FIG. 4 are supplied through the pixel buffer 12 to the frame memory 5. In this manner, the drawing processor 4 of the present embodiment produces the pixel data (corresponding to the dots 0 through 78 of FIG. 4), which defines an image of the polygon (or the triangle ABC) on the CRT screen, by performing the DDA processing for each of the scan lines.

In the above-described embodiment, a waiting condition of the 3-input DDA unit 11 of the drawing processor 4 with respect to the drawing processing of a single polygon is minimized. That is, in the case of the polygon data of FIG. 4, the waiting condition of the 3-input DDA unit 11 occurs only during five clock cycles: the repetition of the DDA processing for the white dot 2; the repetition of the DDA processing for the white dot 78; the change of the DDA processing for the white dot 3; the "middle" DDA processing for the white dot 78 at the process end; the change of the DDA processing for the white dot 35. Accordingly, the 3D graphics processing apparatus of the present embodiment is effective in preventing a delay of the drawing processing as in the conventional 3D graphics processing devices. It is possible for the 3D graphics processing apparatus of the present embodiment to provide speedy drawing processing for a polygon of any type. It is not necessary to enlarge the circuit size in order to incorporate the above capability in the 3D graphics processing apparatus of the present embodiment.

In order to explain the operation of the drawing processor 4 of the present embodiment, the drawing processing for the polygon in the form of a triangle of FIG. 4 is used. However, the present invention is not limited to the above-described embodiment, and it is a matter of course that the 3D graphics processing apparatus of the present invention is applicable to a drawing processing for a polygon of any type, for example, a rectangle, a pentagon, a hexagon, and so on.

In the above-described embodiment, the DDA operation circuit 27 (or the DDA operation circuit 28) uses the 3-input adder AZC. The DDA operation circuit 27 can perform either addition related to the differential value dSZX or the addition related to the differential value DSZY by using a single 3-input adder. The DDA operation circuit 28 can perform either the addition related to the differential value dCLX or the addition related to the differential value dCLY by using a single 3-input adder. Hence, the 3D graphics processing apparatus of the present embodiment can provide speedy drawing processing and is effective in preventing a delay of the drawing processing as in the conventional 3D graphics processing devices.

Next, a description will be given of a comparison of the circuit size of the drawing processor of the present embodiment shown in FIG. 3 with the circuit size of the display process 106 shown in FIG. 26.

For the sake of simplicity of the comparison, it is supposed that a 16-bit bus is used by both the drawing processor 4 and the display process 106. It is supposed that a 1-bit flip-flop (which constitutes one of elements of a 16-bit register) has 6 gates, a 1-bit multiplexer with two inputs has 3 gates, a 1-bit multiplexer with three inputs has 5 gates, a 1-bit multiplexer with four inputs has 6 gates, a 1-bit AND gate with two inputs has 2 gates, a 1-bit XNOR gate with two inputs has 3 gates, a 16-bit 2-input adder has 100 gates, and a 16-bit 3-input adder has 150 gates.

Figure 30A:
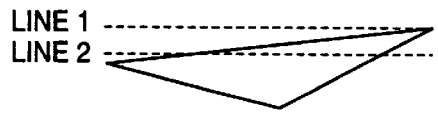
FIG. 30A and FIG. 30B are diagrams for explaining an operation performed by the drawing processor of FIG. 25.
Figure 30B:
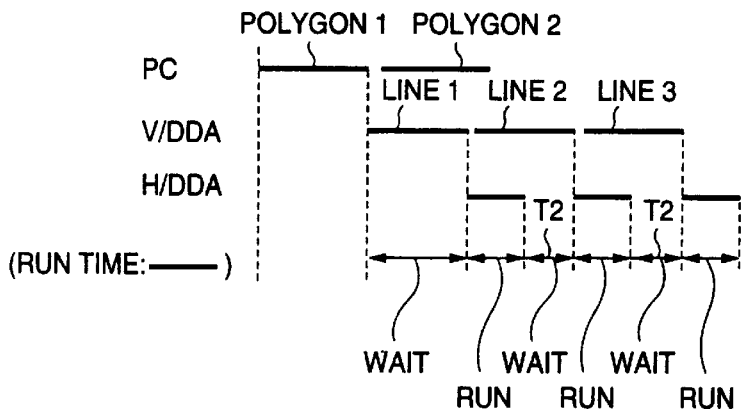

Both the drawing processor 4 of the present embodiment (FIG. 3) and the drawing processor 106 of FIG. 26 utilize the Bresemham algorithm in performing a drawing processing of a polygon so as to avoid the aliasing of a corresponding image of the polygon. As a result of the comparison using the above-mentioned approximation, it is found that the drawing processor 4 of FIG. 3 is constituted by a single arithmetic unit (or the arithmetic unit 16) and 7156 gates, and the drawing processor 106 of FIG. 26 is constituted by a single arithmetic unit (or the arithmetic unit 151) and 7760 gates. The drawing processor 4 of FIG. 3 and the drawing processor 106 of FIG. 26 have an equivalent circuit size. However, in the drawing processor 4 of FIG. 3, the 3-input DDA unit 11 outputs pixel data corresponding to one of dots on a scan line to the frame memory 5 substantially every time the DDA processing for one of the dots is performed by the 3-input DDA unit 11. Therefore, the 3D graphics processing apparatus of the present embodiment is effective in providing speedy drawing processing for a polygon of any type. It is not necessary to enlarge the circuit size in order to incorporate the above capability in the 3D graphics processing apparatus of the present embodiment. The 3D graphics processing apparatus of the present embodiment can effectively prevent a delay (as in FIG. 30B) of the drawing processing as in the drawing processor 106.

Figure 20:
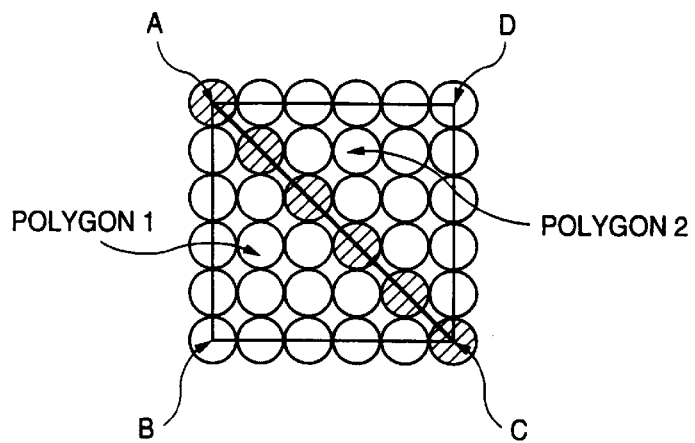
FIG. 20 is a diagram for explaining a drawing processing of the drawing processor of FIG. 3 for successively connected polygons.
Figure 21:
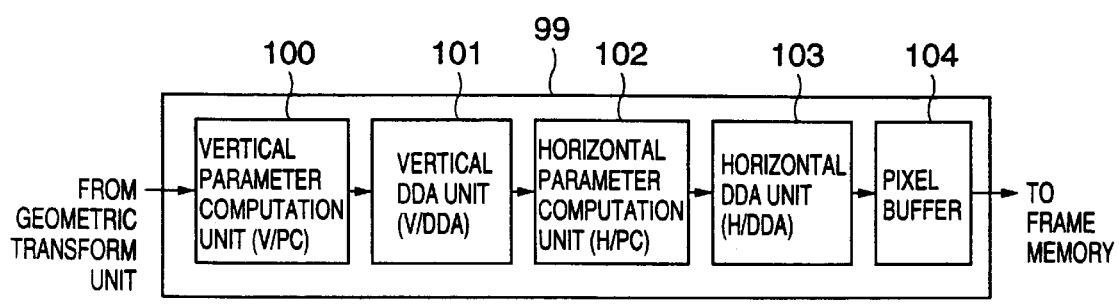
FIG. 21 is a block diagram of a conceivable drawing processor related to a drawing processor of a conventional 3D graphics processing device.
Figure 23A:
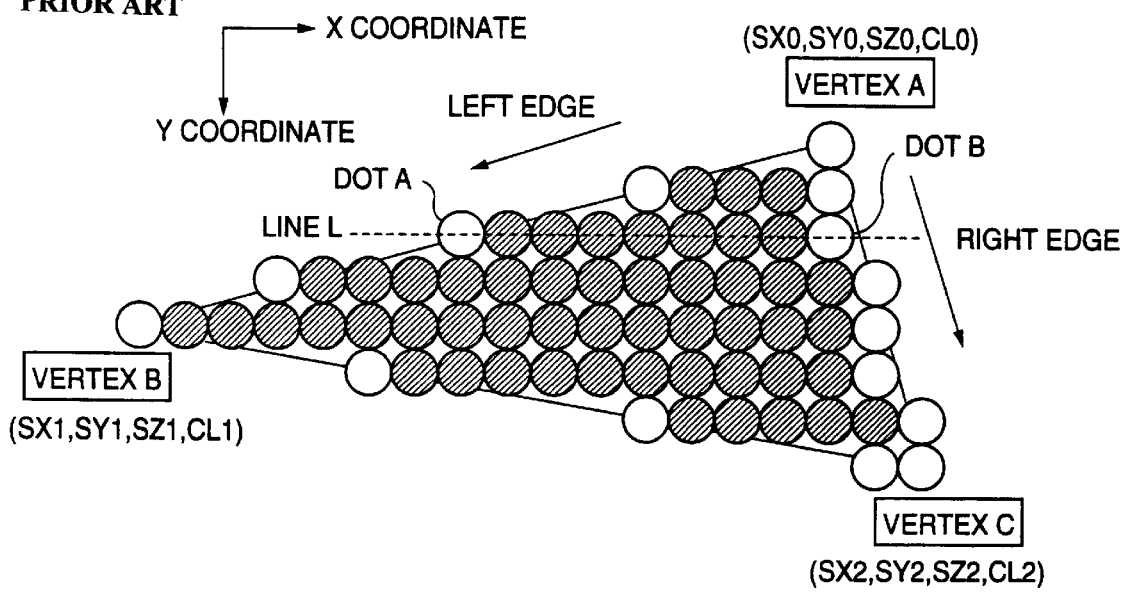
FIG. 23A and FIG. 23B are diagrams for explaining a drawing processing performed by the drawing processor of FIG. 21.
Figure 23B:
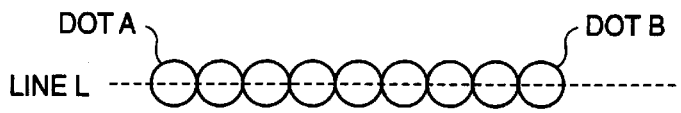
Figure 24A:
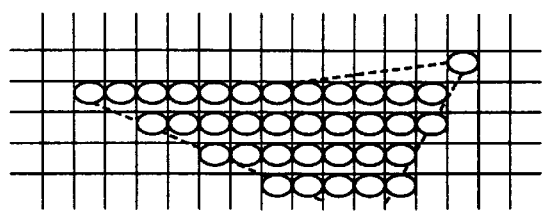
FIG. 24A and FIG. 24B are diagrams for explaining examples of pixel data produced by the drawing processor of FIG. 21.
Figure 24B:
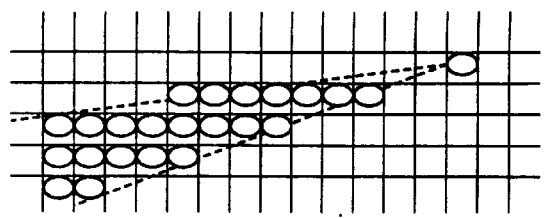
Figure 27A:
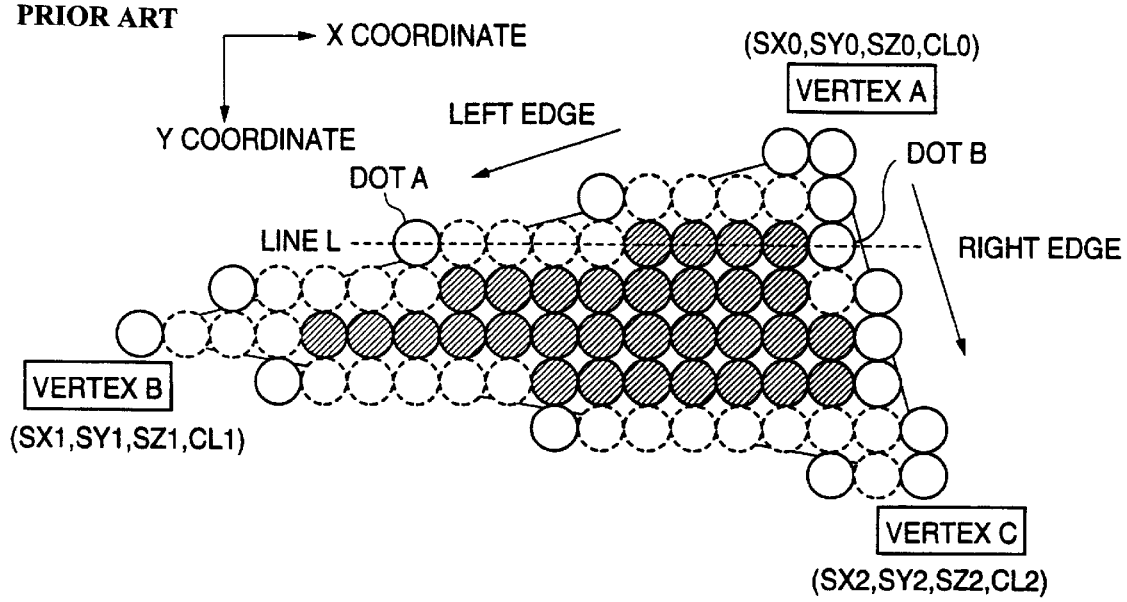
FIG. 27A and FIG. 27B are diagrams for explaining a displaying processing for polygon data performed by the drawing processor of FIG. 25.
Figure 27B:
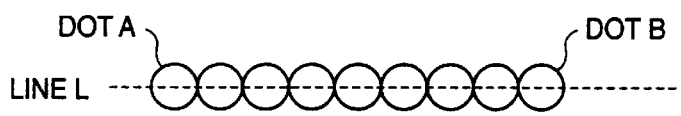
Figure 28A:
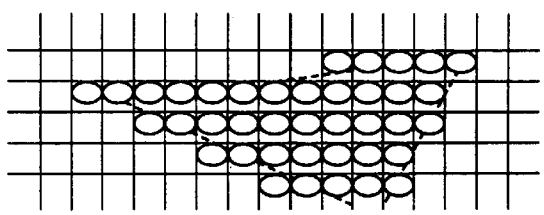
FIG. 28A and FIG. 28B are diagrams for explaining examples of pixel data produced by the drawing processor of FIG. 25.
Figure 28B:
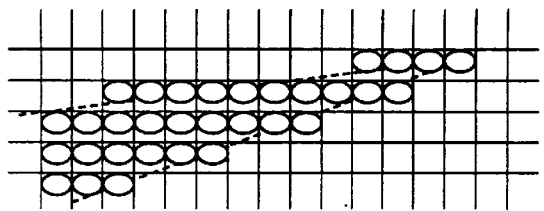
Figure 29A:
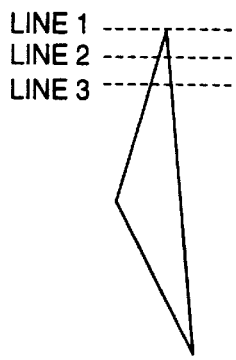
FIG. 29A and FIG. 29B are diagrams for explaining an operation performed by the drawing processor of FIG. 21.
Figure 29B:
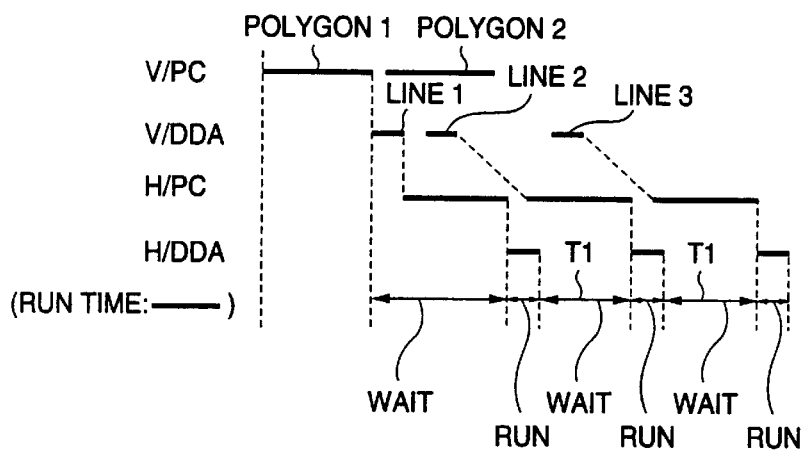

FIG. 20 is a diagram for explaining a drawing processing of the drawing processor of FIG. 3 for successively connected polygons.

In the case of FIG. 20, the successively connected polygons form a polygon ABCD in the form of a rectangle. The polygon ABCD is constituted by successively connecting a first polygon ABC in the form of a triangle and a second polygon ACD in the form of a triangle. In the drawing processor 4 of the present embodiment, when vertex data of the successively connected polygons (or the polygon ABCD) are supplied to the DDA control unit 13 by the parameter computation unit 10, the DDA control unit 13 controls the 3-input DDA unit 11 so as to inhibit the outputting of pixel data corresponding to dots of the edge AC which is shared by the first polygon ABC and the second polygon ACD. Specifically, in the drawing processor 4 of the present embodiment, after a drawing processing for the first polygon ABC is carried out, the DDA control unit 13 controls the 3-input DDA unit 11 during a drawing processing for the second polygon ACD such that the 3-input DDA unit does not output pixel data for dots of the edge AC shared by the two polygons. To do this, the DDA control unit 13 sets the output data condition of the 3-input DDA unit 11 with respect to the pixel data for the dots of the edge AC is set at the "NV (not valid)".

Therefore, in the 3D graphics processing apparatus of the above-described embodiment, duplication of the drawing processing for an edge shared by successively connected polygons is eliminated, and the 3D processing graphic processing apparatus of the present embodiment is effective in providing speedy drawing processing for a polygon of any type.

Further, in the above-described embodiment of FIG. 18 and FIG. 19, the 3-input DDA unit 11 performs one of the left DDA processing, the right DDA processing and the middle DDA processing for dots on a scan line successively on the order of "left", "right" and "middle". However, the present invention is not limited to this embodiment, and the controlled sequence in which the 3-input DDA unit 11 performs the DDA processing for dots on a scan line may be changed to the order of "right", "left" and "middle".

Further, in the 3-input DDA unit 11 of the embodiment of FIG. 3, the DDA operation circuit 26 has the register SXM which stores the largest x-coordinate stored in the register DSX when a left DDA processing is performed, the DDA operation circuit 27 has the register SM which stores a corresponding z-value for the largest x-coordinate stored in the register SXM, and the DDA operation circuit 28 has the register CM which stores a corresponding color value for the largest x-coordinate stored in the register SXM. When a middle DDA processing is subsequently performed after the end of the left DDA processing, the 3-input DDA unit 11 calculates pixel data for one of dots on a scan line based on the values of the registers SXM, SM and CM, and outputs the pixel data through the pixel buffer 12 to the frame memory 5.

Alternatively, the 3-input DDA unit 11 may be modified such that the DDA operation circuit 26 has a register SXM which stores the smallest x-coordinate stored in the register DSX when a right DDA processing is performed, the DDA operation circuit 27 has a register SM which stores a corresponding z-value for the smallest x-coordinate stored in the register SXM, and the DDA operation circuit 28 has a register CM which stores a corresponding color value for the smallest x-coordinate stored in the register SXM. In such a modification, when a middle DDA processing is subsequently performed after the end of the right DDA processing, the 3-input DDA unit 11 calculates pixel data for one of dots on a scan line based on the values of the registers SXM, SM and CM, and outputs the pixel data through the pixel buffer 12 to the frame memory 5.

In the above-described embodiment, the vertex data for one of vertices of a polygon is constituted by an x-coordinate (SX) on the screen coordinate system, a y-coordinate (SY) on the screen coordinate system, a z-value (SZ) and a color value (CL), and the color value (CL) indicates an intensity of a color of the vertex. Alternatively, a color value (CL) indicating a luminance value of the vertex may be used. Further, the vertex data for a vertex of a polygon may be constituted by texture mapping coordinate data.

Further, the z-value calculated by the drawing processor 4 of the above-described embodiment may be used for a hidden-surface removal processing using the z-buffer algorithm. In such a case, an image of a polygon after the hidden-surface removal processing is performed is displayed on the screen of the CRT monitor 6.

Further, the present invention is not limited to the above-described embodiments, and variations and modifications may be made without departing from the scope of the present invention.

The present invention is based on Japanese priority application No.9-217781, filed on Aug. 12, 1997, the entire contents of which are hereby incorporated by reference.

What is claimed is:

1. A three-dimensional graphics processing apparatus in which a drawing processing of a polygon is performed through a digital differential analyzer DDA processing, comprising:

a parameter computation unit for calculating parameters based on vertex data of the polygon on a screen coordinate system, the vertex data being obtained by a geometrical transformation; and a digital differential analyzer DDA unit for producing pixel data, defining a polygon image on a screen, based on the vertex data and the parameters from the parameter computation unit through the DDA processing, wherein the DDA unit performs the DDA processing, including a left DDA processing a right DDA processing, and a middle DDA processing, in a controlled sequence for each of dots on a scan line, the dots including a right endpoint dot and a left endpoint dot where the scan line intersects a polygon right edge and a polygon left edge, respectively, and the DDA unit outputs the pixel data corresponding to one of the dots to a frame buffer substantially every time said DDA processing for said one of the dots is performed, and wherein the DDA unit includes a DDA operation circuit which performs a selected one of the left DDA processing, the right DDA processing, and the middle DDA processing to produce each of an x-coordinate, a z-value, a color value, and a y-coordinate for said one of the dots based on at least one of the vertex data and the parameters supplied by the parameter computation unit, and outputs the resulting value.

2. The three-dimensional graphics processing apparatus according to claim 1, wherein the parameter computation unit outputs the parameters, the parameters being used by a DDA processing according to a Bresenham algorithm, and the parameters with respect to one of the dots include differential values and error values calculated from the vertex data in accordance with predetermined formulas.

3. The three-dimensional graphics processing apparatus according to claim 1, further comprising a DDA control unit, connected to the parameter computation unit, for controlling the DDA unit such that the DDA unit outputs the pixel data corresponding to one of the dots to the frame memory substantially every time the DDA processing for one of the dots is performed by the DDA unit.

4. The three-dimensional graphics processing apparatus according to claim 3, wherein, when vertex data of successively connected polygons are supplied to the DDA control unit by the parameter computation unit, the DDA control unit controls the DDA unit so as to inhibit the outputting of pixel data corresponding to dots of an edge shared by the polygons.

5. The three-dimensional graphics processing apparatus according to claim 3, wherein the DDA control unit determines whether a predetermined condition for changing one of a left DDA processing, a right DDA processing and middle DDA processing to another is satisfied for one of the dots on the scan line, and the DDA control unit controls the DDA unit in accordance with the determination, such that the DDA unit selectively performs one of the left DDA processing, the right DDA processing and the middle DDA processing for one of the dots on the scan line.

6. The three-dimensional graphics processing apparatus according to claim 5, wherein the DDA unit outputs the pixel data for one of the dots near the polygon left edge when the left DDA processing is performed, the DDA unit outputs the pixel data for one of the dots near the polygon right edge when the right DDA processing is performed, and the DDA unit outputs the pixel data for one of intermediate dots between the polygon left edge and the polygon right edge when the middle DDA processing is performed.

7. The three-dimensional graphics processing apparatus according to claim 1, wherein said DDA operation circuit includes an x-coordinate DDA operation circuit which performs a selected one of the left DDA processing, the right DDA processing, and the middle DDA processing to produce an x-coordinate value of said one of the dots based on the vertex data supplied by the parameter computation unit, and outputs the resulting x-coordinate.

8. The three-dimensional graphics processing apparatus according to claim 1, wherein said DDA operation circuit includes a z-value DDA operation circuit which performs a selected one of the left DDA processing, the right DDA processing, and the middle DDA processing to produce a z-value of said one of the dots based on the vertex data and the parameters supplied by the parameter computation unit, and outputs the resulting z-value.

9. The three-dimensional graphics processing apparatus according to claim 1, wherein said DDA operation circuit includes a color-value DDA operation circuit which performs a selected one of the left DDA processing, the right DDA processing, and the middle DDA processing to produce a color value of said one of the dots based on the vertex data and the parameters supplied by the parameter computation unit, and outputs the resulting color value.

10. The three-dimensional graphics processing apparatus according to claim 1, wherein said DDA operation circuit includes a y-coordinate DDA operation circuit which performs a selected one of the left DDA processing, the right DDA processing, and the middle, DDA processing to produce a y-coordinate value of said one of the dots based on the vertex data supplied by the parameter computation unit, and outputs the resulting y-coordinate.

* * * * *